United States Patent [19] [11] 3,873,817
Liang [45] Mar. 25, 1975

[54] ON-LINE MONITORING OF STEAM TURBINE PERFORMANCE

[75] Inventor: Chu Yu Liang, Monroeville, Pa.

[73] Assignee: Westinghouse Electric Corporation, Pittsburgh, Pa.

[22] Filed: May 4, 1972

[21] Appl. No.: 250,337

Related U.S. Application Data

[63] Continuation-in-part of Ser. No. 249,898, May 3, 1972, abandoned.

[52] U.S. Cl.............. 235/151.21, 444/1, 176/19 R
[51] Int. Cl.... G06f 15/06, G06f 15/46, F01d 21/14
[58] Field of Search...... 235/151.21; 415/17; 60/73; 444/1; 176/19, 24; 322/17

[56] References Cited
UNITED STATES PATENTS

| | | | |
|---|---|---|---|
| 3,552,872 | 1/1971 | Giras et al. | 415/17 |
| 3,555,251 | 1/1971 | Shavit | 235/151 |
| 3,561,216 | 2/1971 | Moore, Jr. | 60/73 |
| 3,564,273 | 2/1971 | Cockrell | 415/17 X |
| 3,588,265 | 6/1971 | Berry | 415/17 X |

OTHER PUBLICATIONS

Application of the Prodac 50 System to Direct Digital Control, J. C. Belz, G. J. Kirk, & P. S. Radcliffe, IEEE Intl. Conv. Rec. Part 3, 1965, pp. 102–122.
Monitoring and Automatic Control in Steam Power Stations by Process Computer, E. Doetsch & G. Hirschberg, Siemens Review XXXV (1968), No. 12, pp. 471–476.

Primary Examiner—Felix D. Gruber
Assistant Examiner—Edward J. Wise
Attorney, Agent, or Firm—D. C. Abeles

[57] ABSTRACT

On-line monitoring of system, component of instrumentation performance is provided for the secondary cycle of a nuclear fueled electric power generation system. The performance figures are periodically calculated and compared with bogie figures by a programmed digital computer which prints out the results at intervals and on demand. Calculations of parameters for portions of the turbine system operating in the wet steam region are made through successive iterations based on assumed values and convergence steering data generated from heat or flow balances around adjacent components. A two step input reasonability check identifies, and under certain conditions substitutes for, abnormal values of the analog signals supplied to the digital computer from the plant secondary cycle.

23 Claims, 30 Drawing Figures

ON-LINE MONITORING OF STEAM TURBINE PERFORMANCE

CROSS-REFERENCE TO RELATED APPLICATIONS

This application is a continuation-in-part of application Ser. No. 249,898 May 3, 1972, now abandoned.

BACKGROUND OF THE INVENTION

1. Field of the Invention

This invention relates to elastic fluid turbines and more particularly to the monitoring and evaluating of turbine system, component, and instrumentation performance.

2. State of the Prior Art

Steam turbines which convert thermal energy into mechanical energy by employing expanding steam to impart rotation to a turbine shaft, have gained a predominant position in a large power applications such as electric power generation and ship propulsion systems. Particular types of steam turbines are classified in many ways. They may be classified as fossil fueled or nuclear fueled on the basis of the source of the thermal energy for the steam generation system. Another broad classification distinguishes between a prime mover steam turbine such as one employed to drive the generators in a large electrical power system, and a combination prime mover and extraction steam turbine wherein the turbine is utilized to provide power for an industrial plant and controlled process steam, such as is required in a paper making plant. The general turbine types may be further subclassified on the basis of power ratings, structural design features, etc. The various classifications of steam turbines overlap in many instances.

Typically, the large steam turbines include a high pressure section, a low pressure section, and in many instances, an intermediate pressure section with each section including several states of stator and rotor blades in two or more groups. Most large steam turbines are provided with one or more reheat stages to raise the enthalpy of the steam as it courses through the turbine sections. Turbine operation is normally directed to control of selected end controlled and intermediate controlled system variables depending upon the type of installation. In large electric power generation systems, the end controlled variables are the megawatt electrical load and the frequency participation of the unit in the power network, while turbine inlet steam flow is the primary intermediate controlled variable which establishes the conditions of the end controlled variables.

The fossil fueled large electric power generating systems utilize a drum type, once through type or other form of boiler system to deliver inlet steam to the turbine at temperatures in the neighborhood of 1,000°F. and at constant throttle pressures in the neighborhood of 2,000 psi and as high as 3,500 psi. Steam under such conditions is superheated and it remains superheated as it courses through the high pressure section, the intermediate pressure section and through a good deal of the low pressure section typically provided in a fossil fueled steam turbine. Reheaters between the high pressure turbine and the intermediate pressure turbine, and in some installations between the intermediate pressure turbine and the low pressure turbine, assist in maintaining the steam in the superheated region.

In nuclear steam turbine installations, the thermal energy released by nuclear reaction is employed to generate the steam which provides the motive flow for the turbine. The nuclear steam generating systems are of three general types. In the pressurized water reactor system (PWR), the reactor coolant which is light water circulates through the core of the reactor and the primary side of a steam generator in a primary cycle which is enclosed within the nuclear containment. A completely independent supply of water circulates in a secondary cycle which includes the secondary side of the steam generator, the turbine working section and the condenser. The reactor coolant is pumped around the primary cycle under pressure and remains in the compressed liquid state. The water in the secondary cycle is transformed from the liquid to vapor state in the steam generator, permitted to expand in the turbine working sections and returned to the liquid state in the condenser. In the boiling water reactor system (BWR), the reactor coolant, which is also light water, becomes radioactive steam which provides the motive flow to the turbine. The high temperature gas reactor employs a primary cycle and a secondary cycle similar to the PWR system, however, it utilizes a gas such as helium in a liquid state as the reactor coolant.

In all three of the nuclear steam generating systems, the pressure of the reactor coolant has been limited to less than 2,500 psi. Due to the physical properties of water which is used as the reactor coolant in the PWR and BWR systems, the steam supplied to the inlet of the high pressure turbine in these systems is in the wet region although it characteristicly has a quality of at least 0.9975. On the other hand, the inherent properties of helium permit the high temperature gas reactor system to generate superheated steam at temperatures and pressures comparable to that produced by fossil fueled steam generators.

The differences in the character of the steam generated in the PWR and BWR systems, affects the design of the turbine system. In the PWR system, the steam generator outlet pressure is in the neighborhood of only 800 to 1,000 psi, therefore, turbines supplied by these steam generators, do not have an intermediate pressure section but may have two or three low pressure turbines supplied in parallel by reheated steam from the high pressure turbine. In addition, both the high pressure turbines and the low pressure turbines are generally double flow and are much larger in diameter. Turbine blade tangential speed limitations have resulted in operating the larger diameter nuclear turbines at 1,800 rpm rather than 3,500 rpm which is standard for the large fossil fueled electric power generating steam turbine combinations. The PWR systems are also equipped with moisture separators between the high pressure turbine and the reheaters to mechanically remove most of the moisture in the high pressure turbine exhaust.

Despite the differences in the structure and operating conditions among the various turbine systems, a key factor considered in the initial design of any turbine is the thermal efficiency of the system. In electric power generator, the overall thermal efficiency of the system is expressed in terms of the heat rate which is defined as the number of BTU's required to generate each kilowatt hour of electricity. In view of the large amount of power that must be generated in a modern electrical power plant, small variations in the efficiency of the system in converting thermal to electrical energy can have considerable economic effect. Power companies are therefore also concerned with the on-line efficiency of the system. A drop in the thermal efficiency can be an indication of leaks, deterioration of components such as fouling of the condensers or heaters, etc., or internal failure of a component. By monitoring individual component performance, the source of the difficulty can be located and an evaluation can be made as to the course of action to be taken.

It has been a practice to make periodic checks on the condition of the turbine system components through an overhaul inspection every one or two years. However, such as inspection requires tear down of the turbine which shuts down the system for approximately two months. Under such practice, limited on-line monitoring of some components such as condenser vacuum is conducted and in some fossil fueled systems, monthly or bi-monthly temperature and pressure readings are taken from which the heat rate and turbine efficiency can be calculated by slide-rule.

Recently, programs have been developed for operating digital computers to conduct on-line monitoring of fossil fueled turbines. Turbine efficiency calculations can be made quite easily by these programs since as mentioned previously, the fossil fueled systems operate with superheated steam and the enthalpy of a superheated steam at various stages in the turbine needed for the efficiency calculation can be determined as a function of temperature and pressure alone. However, it is not possible to determine the enthalpy of wet steam such as that used in PWR and BWR systems without knowing the moisture content of the steam. The problem is compounded by the fact that moisture is extracted along with the wet steam at various points in the turbine. This mixed flow makes it difficult to determine the separate enthalpies of the wet steam and the saturated liquid. A proposed solution to the problem is to interject radioactive isotopes or chemical tracers in the steam generator feedwater and then take samples of the extraction flow and test for the presence of the isotopes or tracers. Such a test requires laboratory analysis and therefore does not possess an on-line capability. In addition, many samples must be taken in order to construct a profile of each group or stage.

SUMMARY OF THE INVENTION

According to the invention, a programmed digital computer is adapted to provide on-line monitoring of system, component and instrumentation performance in a nuclear fueled electric power generating system.

The reasonability of like monitoring signals is checked by first comparing the difference between the largest and smallest value with a first design figure. If this design figure is exceeded, the value of each of the like monitoring signals is compared with a bogie figure which is calculated as a function of the operating conditions of the system. If the difference between the value of any of the signals and the bogie figure exceeds a second design figure, that value is tagged and preferably the value of the signal which is closest to the bogie figure is substituted for the abnormal value in the performance calculations.

The performance calculations are arranged to provide comprehensive system analysis from a minimum of instrumentation. Calculations of performance data associated with portions of the turbine system operating in the wet steam region are made by operating a digital computer to assume a moisture content for the wet steam, calculating a first performance variable as a function of the assumed moisture content, then calculating a calculated value of the moisture content as a function of the calculated first performance variable and an independently calculated performance variable and finally operating the digital computer to compare the calculated and assumed values of moisture content. The calculations are repeated by substituting a function of the calculated moisture content for the assumed moisture content until the assumed and calculated values are within predetermined limits. The independently calculated performance variables may be variable calculated by previous steps or they may be calculated from heat balances or flow balances around adjacent portions of the system.

On-line monitoring is provided by periodically recalculating the selected performance variables. The trends established by such periodic calculations provide valuable information on changes in the operating conditions of the various portions of the turbine system being monitored. For this reason, it is not necessary that the calculations generate highly accurate values for the performance variables. In order to establish the trends, the initial run of the monitoring system utilizes the design values for the various bogie figures. The results of the first run, which will differ somewhat from the design values, are then used on all subsequent runs as the bogie figure. These bogie figures may be periodically updated to accomodate for normal system wear.

Applying the invention to the calculation of the wet steam group outlet enthalpies, the digital computer calculates the change in enthalpy for an isentropic expansion in the group, assumes a moisture content for the outlet steam and then calculates the outlet steam enthalpy as a function of the assumed moisture content and the change in enthalpy for an isentropic expansion. The calculated value of the moisture content is then compared with the assumed value and successive iterations are performed until the deviation between assumed and calculated values of the moisture content is within predetermined limits.

For portions of the turbine where the extraction flow is measured, the expansion line points can be determined by calculating the flow of removed moisture as a function of an assumed moisture content, determining the enthalpy of the extracted liquid, determining the enthalpy of the extracted steam from the enthalpies and flows of the liquid removed and the total extraction flow, calculating the enthalpy of the wet steam prior to extraction from a heat balance around the extraction point, and then using this enthalpy to calculate the moisture content. Again the assumed and calculated values of the moisture content are compared and the calculations are repeated until they differ by less than a predetermined amount.

The invention may also be applied to analyzing the performance of the last group of the high pressured turbine in a Rankine regenerative cycle operating on wet steam by assuming a relative proportion of the last group steam flow which is directed to the reheater as exhaust steam and that which is directed to the feedwater heater as extraction steam. The enthalpy of the exhuast steam is determined from a heat balance around the reheater. Since the enthalpy of the extraction steam is the same as that of the exhaust steam, a heat balance around the feedwater heater will determine a value for the extraction flow. This calculated extraction flow is then compared with the assumed flow and the calculations are repeated until the deviation in the assumed and calculated values is within predetermined limits. Where a moisture separator is interposed between the high pressure turbine exhaust and the reheater, an additional heat balance is performed around the moisture separator to determine the enthalpy of the exhaust steam.

The invention also contemplates the calculation of the power contributed by a selected group of a steam turbine having mixed flow extraction by using group inlet and outlet moisture contents to calculate the inlet and outlet enthalpies. The difference in the inlet and outlet enthalpy multiplied by the group steam flow determines the group power contribution.

According to another feature of the invention, the expansion line points for a plurality of groups of the turbine, are calculated and then used to determine the extraction flows from each individual group. The sum of the calculated extraction flows is then divided by the measured total extraction flow to generate a correction factor. The correction factor is utilized to calculate corrected extraction flows which in turn are used to recalculate the expansion line points.

Another aspect of the invention contemplates the determination of the heat rejected by the condenser by performing a total plant heat balance. From this calculation, the enthalpy of the steam entering the condenser can be determined. In determining the expansion line points of the last stages of the turbine, an assumed moisture content is utilized to determine the exhaust enthalpy. Successive iterations using corrected values for the assumed moisture content can be made until the calculated exhaust enthalpy agrees with the condenser inlet enthalpy within predetermined limits.

The invention embraces both the method and apparatus adapted for applying the above on-line monitoring features to a steam turbine system.

BRIEF DESCRIPTION OF THE DRAWINGS

An understanding of the invention may be gained from reference to the description of the preferred embodiment of the invention and the accompanying drawings in which.

DESCRIPTION OF THE PREFERRED EMBODIMENT

Figure 1:
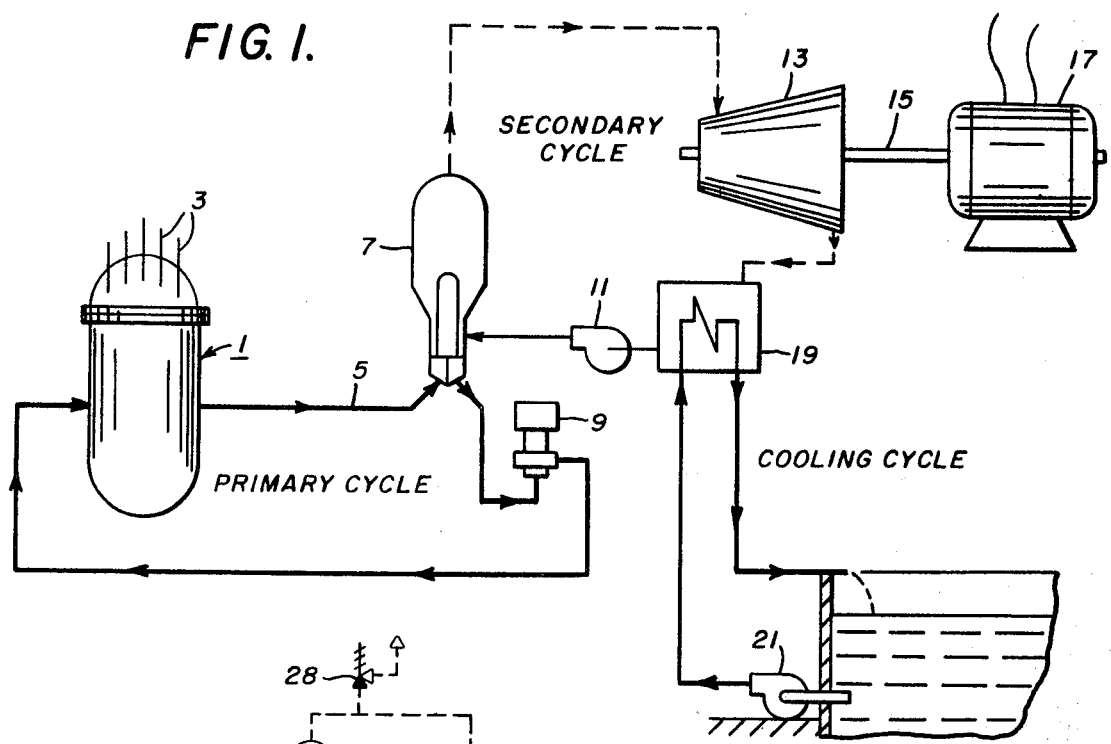
FIG. 1 is a simplified schematic diagram of a nuclear fueled electric power generating system to which the invention is applied.

The invention will be described as applied to a pressurized water reactor (PWR) electric power generation system as that illustrated in simplified form in FIG. 1. The system includes a nuclear reactor 1 in which a fission reaction regulated by control rods 3 releases thermal energy in a well known manner. A reactor coolant in the form of light or ordinary water, circulates around the core of the nuclear reactor where its enthalpy is raised by the heat of the fission reaction. The reactor coolant is pumped through associated piping 5 and the primary side of a steam generator 7 by reactor coolant pump 9. The heat absorbed by the reactor coolant in the nuclear reactor 1 is given up in the steam generator 7 in the process of vaporizing feedwater supplied to the steam generator 7 by feedwater pump 11. The steam generated by the steam generator 7 is permitted to expand under controlled conditions in the turbine 13 to impart rotation to the turbine shaft 15 which drives an electrical power generator 17. Vitiated steam from the turbine is directed to a condenser 19 from which the condensate is pumped back to the steam generator by the feedwater pump 11. Circulating water supplied to the condenser from an ultimate heat sink, such as a lake or a river, by circulating pump 21 causes condensation of the vitiated steam by absorbing its latent heat. The circulating water is then returned to the ultimate heat sink.

In such a system, the process by which the thermal energy generated in the nuclear reactor is given up in the primary of the steam generator is referred to as the primary cycle. The process of transforming feedwater into steam in the steam generator, the doing of work by steam in the turbine, the condensation of the vitiated steam in the condenser and the returning of the condensate or feedwater to the steam generator, is known as the secondary cycle. The thermodynamic process of supplying ambient water to absorb the latent heat of the vitiated steam in the condenser can be referred to as the cooling cycle. The thermodynamic processes carried out in these cycles are well known and covered extensively in the texts.

Figure 2:
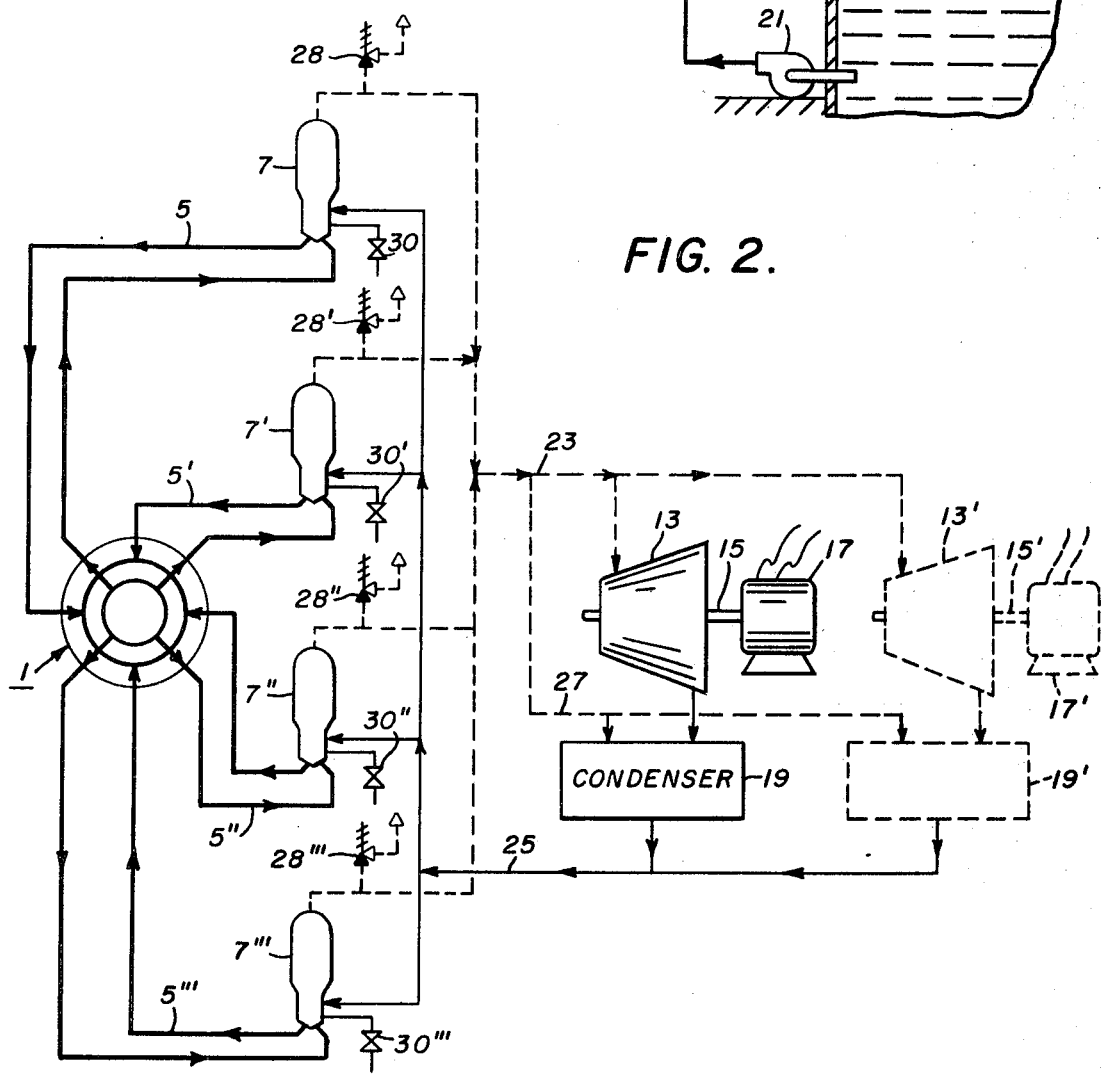
FIG. 2 is a schematic diagram of an exemplary form of the power generating system illustrated in FIG. 1 emphasizing the steam generation system.

While FIG. 1 illustrates a primary cycle in which a nuclear reactor services a single steam generator, in practice each nuclear reactor will supply thermal energy to several steam generators. In FIG. 2 it is shown that the nuclear reactor 1 supplies thermal energy to four steam generators 7–7'''. This arrangement is referred to as a four loop system. Most installations today utilize a two, three or four loop primary cycle. As shown in FIG. 2, the steam outlets of the steam generators are connected in parallel to supply a common steam line 23. Steam from the steam line 23 expands in the turbine 13, is condensed in condenser 19 and returned to the steam generators through the common feedwater line 25 which directs feedwater to all four steam generators in parallel. In the United States, each nuclear reactor operates only one turbogenerator combination; however, in Europe it is accepted practice for a single nuclear steam supply system to power two turbogenerator combinations connected in parallel. For this reason, a second turbogenerator combination is shown in dashed lines in FIG. 2 with primed referenced characters.

Variations in the megawatt electrical load imposed on the turbogenerator combination are compensated for by manipulation of the control rods 3 in the nuclear reactor. Due to the delay in the response of the nuclear steam supply system to plant electrical load rejection, improved response of the system to reductions in electrical load is effected by controlled dumping of steam directly to the condenser 19 through dump line 27 and/or dumping of steam directly to the atmosphere through dump valves 28–28'''. Periodically, a controlled amount of steam generator water is ejected through blowdown valves 30–30'''; however, this is done to remove excess chemical deposits in the steam generators rather than as a means of control.

Figure 3:
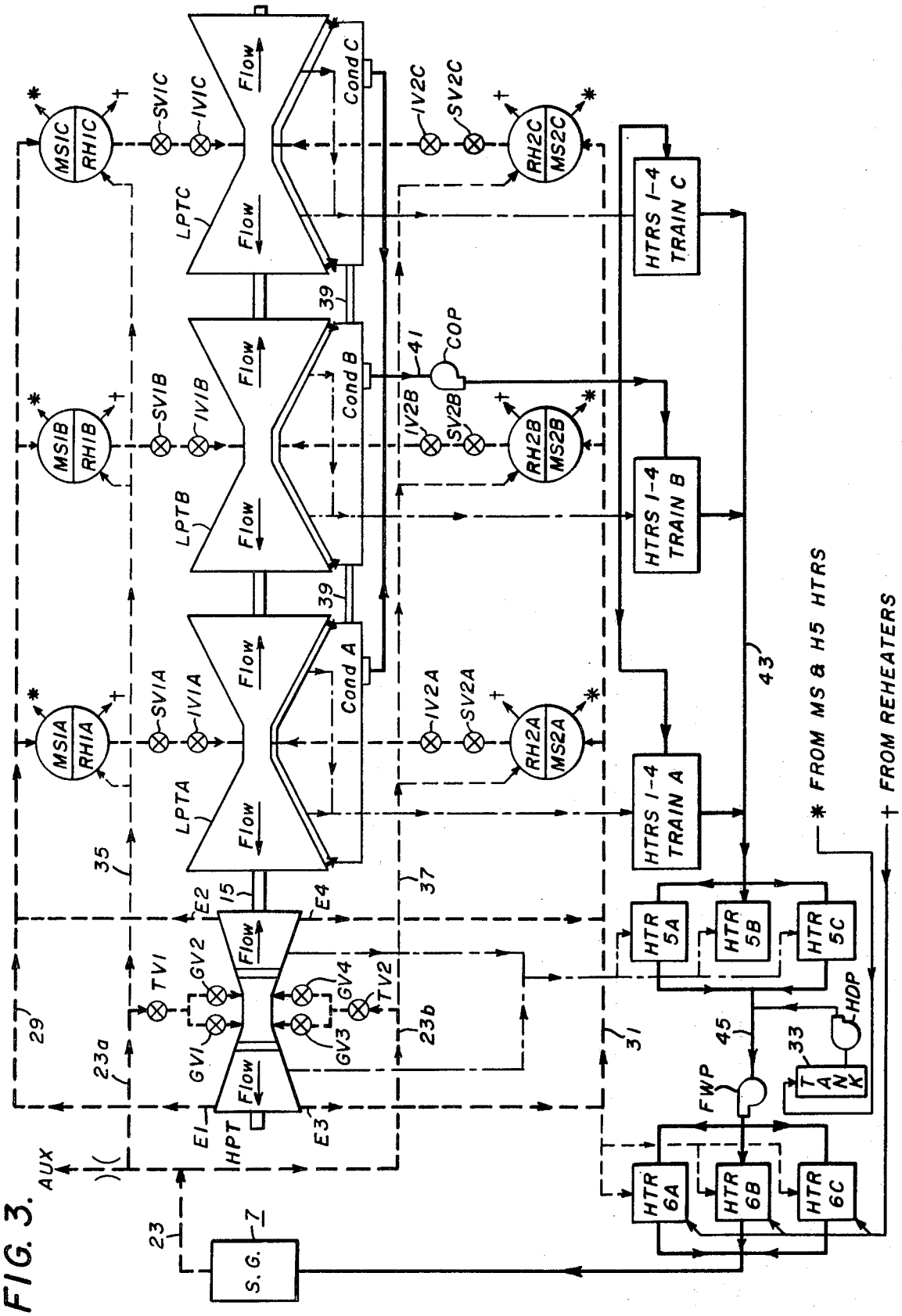
FIG. 3 is a schematic diagram of the turbine portion of the power generating system disclosed in FIGS. 1 and 2.
Figure 4:
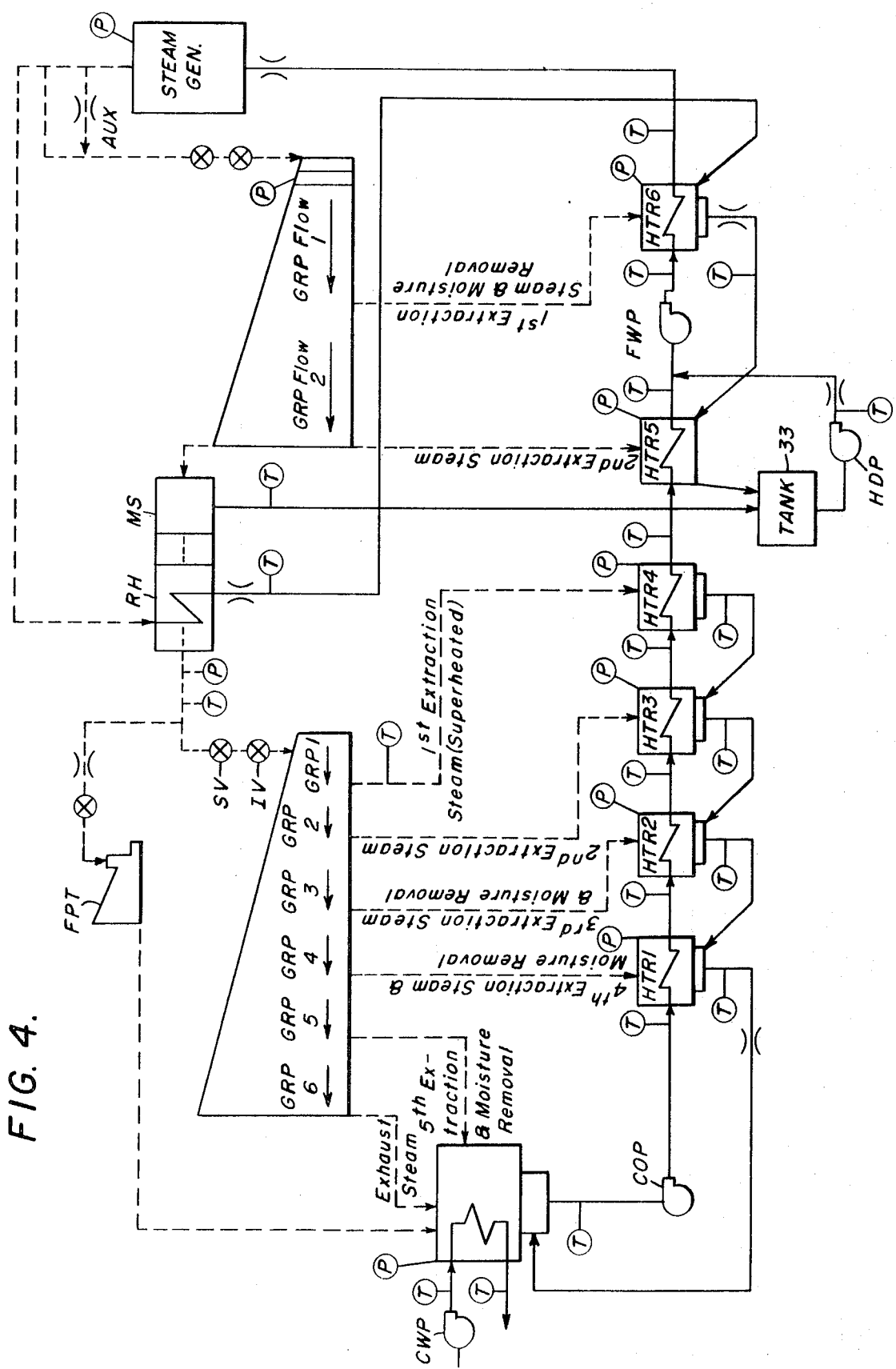
FIG. 4 is a detailed schematic diagram illustrating the interconnections between the components of the system of FIG. 3.

FIG. 3 shows the overall organization of, and FIG. 4 illustrates some of the more detailed interconnections between components of, a typical nuclear secondary plant with a Rankine reheating regenerative cycle. In these figures, flow of water in a liquid state is shown in solid lines, while steam flow, wet or dry, is shown in dashed lines and mixed flow, that is concurrent flow of wet steam and saturated liquid, is shown in dash-dot lines. Although the combination of particular components in any given nuclear turbine system varies widely, the arrangement shown is representative of a large PWR installation. The unit employs a high pressure turbine HPT and three low pressure turbines LPTA, LPTB and LPTC tandemly connected to the turbogenerator shaft 15. Each of the turbine sections is a double axial flow turbine as indicated in FIG. 3. As also shown in FIG. 3, steam from the steam generator 7 is introduced into the inlet steam chest of the high pressure turbine HPT through four lines each of which includes a governor valve GV1 to GV4. Governor valves GV1 and GV2 are supplied with steam through a common branch 23a of the steam line 23. Branch line 23a also includes a throttle valve TV1. Similarly, branch 23b of the steam line 23 supplies steam to governor valves GV3 and GV4 under control of throttle valve TV2. Steam is introduced into the inlet steam chest of the high pressure turbine by the inlet line at four angularly displaced points from each of which the flow is divided into the two axial directions.

Control of steam turbines through manipulation of serially connected throttle valves and governor valves is well known in the steam turbine art. It might be noted that the partial arc valve control now commonly employed with fossil fueled steam turbines to avoid hot spots on the turbine blades has not been found to be necessary in the PWR system which operates at lower steam temperatures and pressures. In fact, the practice in PWR systems is to operate with the throttle valves full open thereby relegating full control to the governor valves. The normal procedure is to control start-up of the turbine through gradual opening of governor valves GV1 and GV2, which introduce steam into two adjacent portions of the inlet nozzle chamber. As the governor valves GV1 and GV2 approach the fully opened position at approximately 70 percent load, valve GV3 is brought into operation and when it is almost fully opened, valve GV4 assumes control. Once the turbine has reached synchronous speed, changes in the RPM of the turbine induced by variations in load, are compensated for through control of inlet steam flow by governor valve GV4.

As mentioned previously, the steam supplied to the high pressure turbine by the steam generators of a PWR system is wet steam. Actually, the steam generators produce saturated steam but the flow causes droplets ot form so that the steam introduced into the high pressure turbine has a quality of approximately 0.9975 or a moisture content of ¼percent. By the time this steam reaches the first group of the high pressure turbine, the moisture content is approximately ½percent. Expansion of the steam in the high pressure turbine applies torque to the turbogenerator shaft 15 and results in the exhausting of steam through exhaust lines E1–E4, two at either end of the high pressure turbine. This high pressure exhaust steam has a quality of approximately 0.89 or 11 percent moisture content at full load.

High pressure turbine exhaust steam from exhaust lines E1 and E2 is delivered to each of the low pressure turbines LPTA, LPTB and LPTC through the common header 29. Similarly, exhaust steam from lines E3 and E4 is delivered to each of the low pressure turbines through common header 31. Before being introduced into the inlet chambers of the low pressure turbines, the wet steam exhausted by the high pressure turbine passes through combination moisture separators and reheaters. Separate moisture separator reheater combinations are interposed between each of the HPT exhaust headers 29 and 31 and each low pressure turbine. The moisture separators are identified by the letters MS and the reheaters by the letters RH followed by the numeral 1 or 2 identifying the header and the letters A, B, or C identifying the low pressure turbine. Thus the moisture separator interposed in the line between the header 29 and the low pressure turbine LPTA is identified by the reference character MSL1A while the reheater interposed between the header 31 and the low pressure turbine LPTC is identified by the reference character RH2C.

The moisture separators consist of a number of performated metal plates which mechanically separate the droplets of water from wet steam which circulates through the apparatus. Present day moisture separators are capable of improving the quality of the steam to to better than 0.99. The saturated liquid thus removed is collected in a tank 33. This interconnection which is shown in FIG. 4 is indicated in FIG. 3 by the asterisks.

The reheaters raise the enthalpy of the steam leaving the moisture separators by circulating the steam around coils supplied with steam from the steam generator through common headers 35 and 37. Drain flow from the reheater coils is delivered to the number 6 heaters as shown in FIG. 4 and as indicated by the daggers in FIG. 3. The reheating process results in a net gain in thermal efficiency for the cycle due to an increase in the average temperature of heat receipt over that of the basic Rankine cycle as is well known and extensively discussed in the texts.

The flow of steam from the reheaters to the low pressure turbines is controlled by stop valves identified by the reference character SV followed by the appropriate numeral and letter corresponding to the reheater with which they are associated. These stop valves are normally opened and are closed only to prevent steam backflow or to protect against turbine overspeed. Intercept valving identified by the reference characters IV and appropriate numeral and letter designations are also interposed in the reheat steam path. These valves are also normally opened but operate over a range of position to provide reheat steam flow cut back under turbine conditions. Both the stop valves and the intercept valves are standard components on large steam turbine systems employing a reheat cycle.

The reheated steam is introduced at diametrically opposite points into the nozzle chamber of each low pressure turbine which diverts the flow axially through each half of the associated low pressure turbine Expansion of the steam in the low pressure turbines adds torque to the turbogenerator shaft 15. The vitiated steam exhausted from either end of each low pressure turbine enters a condenser labeled Cond A, Cond B, or Cond C which form an integral part of the associated low pressure turbine. Condensation of the vitiated steam as it comes in contact with the surface of circulating water tubes (not shown in FIG. 3) produces a vacuum in the condensers. The subatmospheric pressure in the condensers is equalized by equalizing lines 39 interconnecting the individual condensers. Other arrangements for condensers such as separate condensers for each half of each low pressure turbine may be provided. However, it is customary to interconnect separate condenser units to equalize the load imposed on each low pressure turbine.

The condensate which collects in the hotwell at the bottom of each condenser is directed to a common header 41. A condensate pump COP delivers the condensate to Heater Nos. 1–4 of three heater trains, identified as Trains A, B and C, to be described in more detail later. After flowing through Heater Nos. 1–4 of each heater train, the condensate enters a common header 43 from which it is again diverted to pass through Heater No. 5 of each heater train. The condensate then enters a common header 45 to feed the main feedwater pump FWP from which it again divides to pass through Heater No. 6 of each heater train before being returned to the steam generator. It is common practice to refer to the liquid as condensate up until it reaches the feedwater pump and as feedwater thereafter. Although only one condensate pump and one feedwater pump are shown, additional pumps of each type may be connected in parallel. In fact, for the case under consideration, three condensate pumps and two feedwater pumps are provided. The drain from the moisture separators and the No. 5 heaters (See FIG. 4) which accumulates in heater drain tank 33, is pumped into the feedwater pump FWP suction header by heater drain pump HDP. Again, more than one heater drain pump may be provided and in the PWR system being considered, two heater drain pumps are connected in parallel.

The operation of the heater trains can best be understood by reference to FIG. 4. The purpose of the heater trains is to provide successive stages of feedwater regenerative heating. The heat source for this process is derived from steam extracted at several points in the high pressure and low pressure turbines. Each stage of extracted steam is circulated in a separate heater around a tube bundle carrying the feedwater from the condensers to the steam generator. In condensing in the heater to a saturated liquid at its extraction pressure, the vapor gives up any superheat it may have and its latent heat to the feedwater. The quantity of steam extracted for each heater is calculated to be sufficient to raise the temperature of the feedwater to a temperature close to the saturation temperature corresponding to the extraction pressure.

The saturated liquid which accumulates in the heaters as the extraction steam condenses may either be permitted to cascade into the adjacent heater operating at a lower pressure where it will flush into steam and recondense at the lower pressure, thereby giving up additional heat, or it may be pumped into the feedwater line. In some installations, the heaters at the suction side of the feedwater pump are replaced by deaerators in which the extraction steam is mixed directly with the condensate.

The effect of the regenerative process in raising the efficiency of the Rankine cycle is well known in the art. It has been determined that maximum efficiency of the process is obtained when the temperature range per heater is approximately equal. It has also been determined that the increment of added efficiency derived by additional state of the art heaters is not justified by the added cost of hardware for more than six or seven heaters. In fact, many large fossil fueled electric power generating units operate with heater trains having only four stages of heaters. Generally, most of the nuclear fueled power generating systems employ five to seven stages of heaters. It should be understood, however, that as here, several heater trains may be connected in parallel for increased load handling capability.

FIG. 4 shows that six stages of heaters are employed in the exemplary system. Feedwater from the condenser passes through heaters 1-6 in succession before entering the steam generator. Heater No. 1 receives steam extracted after the fourth group of the low pressure turbine, while heaters No. 2, 3 and 4 receive low pressure turbine third, second and first group extractions respectively. Due to the expansion of the steam in the low pressure turbine, the pressure and enthalpy level of the extracted steam increases from the fourth extraction to the first. As a result, the enthalpy level of the feedwater is successively raised as it passes through heaters No. 1-4. Heater No. 5 receives second extraction steam from the high pressure turbine which is a portion of the high pressure turbine exhaust. High pressure turbine first extraction steam which is removed after expansion of the inlet steam in the first group, is applied to Heater No. 6. The extraction points and the amount of steam extracted at each point are selected such that the enthalpy of the feedwater is raised an approximately equal amount as it passes through each of the heaters 1-6.

In the system under consideration, the drain from the heaters is cascaded downward to the heater operating at the next lower pressure except that the drain flow from heater No. 5 is directed to the heater drain tank 33 rather than to heater No. 4. The heater No. 5 drain flow and the drain flow from the moisture separators which accumulates in tank 33 is pumped into the feedwater line at the feedwater pump suction header by drain pump HDP. The drain flow from heater No. 1 is directed to the condenser hotwell where it becomes part of the condensate flow. Drain flow from the reheaters is routed into heater No. 6. All of the heaters except the No. 5 heaters are provided with drain coolers which lower the temperature of the drain flow below the saturation temperature before cascading.

As the moisture content increases with the expansion of the wet steam in the turbine, droplets of water are deposited on the turbine casing by the centrifugal force of rotation. These droplets of water flow down the inclined surface of the turbine casing created by the increasing diameter of the turbine blades until they are diverted into an extraction line by troughs in the turbine casing. This form of moisture removal is provided for the first group of the high pressure turbine and the third, fourth and fifth groups of the low-pressure turbine. The fifth extraction from the low-pressure turbine is primarily for moisture removal and the extracted moisture is dumped directly into condenser. The first extraction steam from the low-pressure turbine remains superheated due to reheating and although the second extraction steam is normally slightly wet, no moisture removal is required for these groups. The mixed flow of removed moisture and wet extracted steam greatly complicates turbine performance monitoring, as will be discussed more extensively later.

For the sake of simplicity, only one-half of the high pressure turbine and one-half of one low pressure turbine are symbolicly represented in FIG. 4. The inter connections between various components can be fully appreciated by considering FIGS. 3 and 4 together. For instance, first extraction lines from the two halves of the high pressure turbine join in a common header which then divides to provide high pressure first extraction steam and removed moisture to the No. 6 heaters of each heater train, A through C. Similarly, the second extraction steam from each half of the high pressure turbine is mixed in a common header before being distributed to the No. 5 heaters of each heater train.

The corresponding extraction lines from each half of low pressure turbine. A merge to form a single line connected to the appropriate 1-4 in the A heater train. Similarly, the corresponding extraction lines for the two halves of low pressure turbines B and C jointly feed into the appropriate heaters in heater trains B and C respectively.

The drain flow from each of the six reheaters is fed directly to the No. 6 heater in the associated heater train. For instance, reheaters RH1A and RH2A are directly, but separately, connected to the No. 6 heater in the A heater train. Individual reheater drain tanks may be interposed between the reheater and the associated heater. Alternatively, the drain flows from reheaters RH1A, B and C may be mixed in a common reheater drain tank, while the drain flows from Reheaters RH2A, B and C are mixed in another common reheater drain tank before being distributed to the No. 6 heaters in each train. The saturated liquid from all of the moisture separators is fed into the common heater drain tank 33.

The heaters 1-4 of each heater train are separately connected in series. However, as previously discussed in connection with FIG. 3, the condensate leaving each of the No. 4 heaters is mixed in a common header before being distributed to the No. 5 heaters and again before being distributed to the No. 6 heaters. On the other hand, the drain flow from the No. 6 heater of each heater train is separately fed into the corresponding No. 5 heater without mixing. Similarly, the drain flow from the No. 1 heater of each heater train is separately returned to the associated condenser. Circulating water for each of the three condensers is supplied from a common header which is fed by a number of parallel connected circulating water pumps. The return water also flows through a common header.

The heater drain pumps HDP, the condensate pumps COP and the circulating water pumps CWP are conventionally electrically driven. The feedwater pumps FWP may also be electrically driven; however, in the larger installations, such as the exemplary system, they are driven by a feedwater pump turbine, FPT. The turbine FPT is supplied with superheated steam from the reheaters during normal operation, as shown in FIG. 4. The vitiated steam is directed to the condensers.

A small portion of the generated steam is diverted for auxiliary uses as indicated by the lines labeled AUX in FIGS. 3 and 4. Some of the auxiliary steam is directed to the primary side of process steam evaporators, where it is utilized to purify the boron from the primary working medium. An additional portion of the auxiliary steam is employed to generate additional steam for plant heating purposes. Still another portion of the auxiliary steam is directed to flash evaporators for turning salt water into make up water to compensate for steam generator blowdowns and system leakage. The drain of the auxiliary steam is returned to the condensers.

It should be understood that the type, number and arrangement of components in any particular installation will vary somewhat from that of the exemplary system, however, it is typical of a large nuclear fueled steam turbine generating system.

FIG. 4 also indicates the instrumentation provided for monitoring component and system performance. The primary parameters monitored are temperature, pressure, and flow. The temperature and pressure sensors are represented respectively by the letters T and P enclosed in a circle, while flow meters are represented by confronting arcs bracketing the point in the line where the flow is to be measured. Thus, referring to Heater No. 1, heater pressure, feedwater inlet and outlet temperatures, drain temperature and drain flow are monitored. Similar instrumentation is provided for the No. 1 heaters in each heater train. In fact, the instrumentation illustrated in FIG. 4 is provided for each of the components which are duplicated in the system. It should be noted that the reheater drain temperature and drain flow readings and the moisture separator temperature readings are taken before the drain lines merge into common headers, therefore, six of each of these instruments are provided. Similarly, the low pressure turbine first extraction temperatures are monitored before the extraction lines merge so that six of these temperature sensors, one for each half of each low pressure turbine, are provided. The duplication of other instrumentations such as impulse chamber sensors for each half of the high pressure turbine are obvious from the previous discussion of the system organization.

Special mention should be made of the circulating inlet and outlet temperature instrumentation. Due to the large quantities of circulating water required for condenser operation, the common inlet and outlet headers may be on the order of 8' in diameter. Even the diameter of the branch lines serving the individual condensers is too large to obtain reliable readings from a single sensor so that two or more sensors may be peripherally displaced around the lines to facilitate the calculation of a representative temperature.

Additional instrumentation not explicity shown in FIG. 4 is provided for monitoring the hydraulic head generated by the feedwater pumps FWP, the condensate pumps COP, the circulating water pumps CWP and the heater train pumps HDP. In addition, the electric power consumed in terms of kilowatts by each of the individual condensate pumps, circulating water pumps and heater drain pumps, is monitored. The power consumed by the feedwater pumps is also monitored and in two and three loop systems where the feedwater pumps are electrically driven, the power consumed is similarly measured in terms of kilowatts of electricity. However, in a four loop system where the feedwater pumps are normally turbine driven, the power consumed is calculated from the flow of steam diverted to the feedwater pump turbines.

All of the instrumentation discussed to this point transmits analog measurements. Digital inputs for the computer include switches indicative of the open or closed position of the No. 3 governor valve, the number of feedwater pumps, condensate pumps, heater drain pumps and circulating water pumps running, and the open or closed position of each of the drain dump valves and the blowdown valves.

It will be seen later that certain features of the invention permit the monitoring of system and component performance with a minimum of instrumentation. The selection of the particular parameters to be monitored is constrained somewhat by certain physical conditions in the system such as the large volumetric flows discussed above. In addition to the difficulty of measuring the flow in large diameter pupes, it is extremely difficult to measure large volume stream flows and the flow of a saturated liquid. The difficulty in measuring the flow of a saturated liquid is attributable to the fact that the drop in pressure created by the venturi in the flow meter causes the liquid to flash into vapor thereby distorting the flow measurement. For this reason, the moisture separator drain flow cannot be measured directly. On the other hand, the heater and reheater drain flows are slightly sub-cooled so that flashing does not occur. The small pressure correction effect is enthalpy calculation due to this sub-cooling is negligible when considering the heater and reheater drain enthalpies. However, all of the flow measurements are corrected for temperature or pressure. Compressed liquid is considered in calculating the enthalpy of feedwater flow through the No. 6 heaters since the pressure correction effect in the high pressure region such as the 1,000 psi on the feedwater at this point does make a difference in specific enthalpy calculation because of the large volumetric flow. In fact, a difference of 1 btu per pound in feedwater enthalpy is reflected in a 5 btu per pound error in the enthalpy of HPT first extraction steam when the heat balance around Heater No. 6 is performed.

THE COMPUTER SYSTEM

Any suitable digital computer with appropriate interfacing for inputting the plant parameters may be employed in the practice of the invention. In the system disclosed, a PRODAC 250 or P250 digital computer marketed by the Westinghouse Electric Corporation has been utilized.

The P250 is basically a SIGMA 2 computer manufactured by Xerox Data Systems. The structural and functional characteristics of the SIGMA 2, and hence also the P250, are described in a Xerox Data Systems publication identified as XDS SIGMA 2 Computer Reference Manual and issued in December, 1969.

Figure 5:
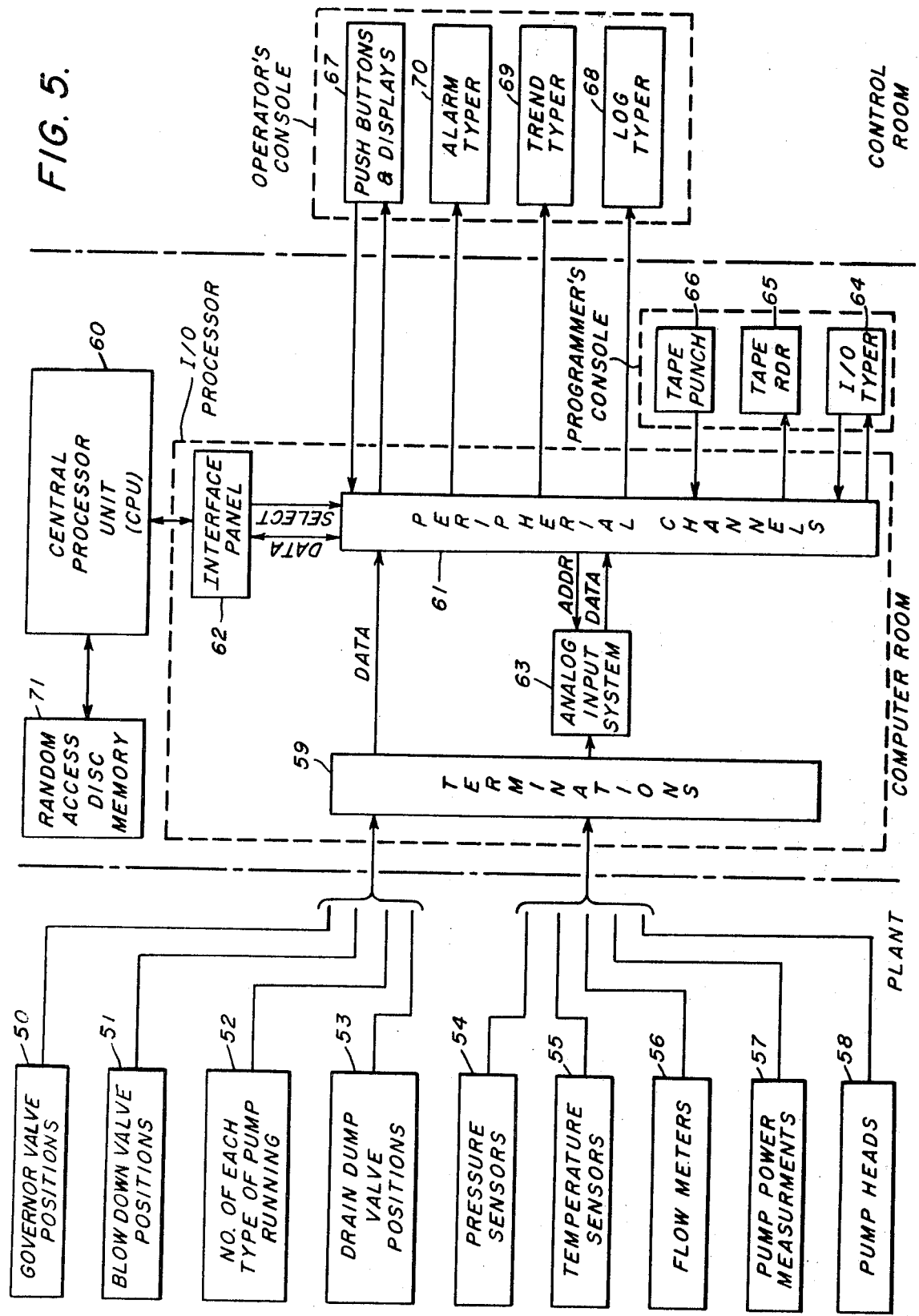
FIG. 5 is a schematic diagram of the digital computer system employed by the invention including the interconnections with the power generating system.

The basic components of the P250 and their relationship to the plant instrumentation previously described, are illustrated in block diagram form in FIG. 5. The vertical sectioning of FIG. 5 indicates the distribution of the various components between the plant, the computer room and the control room.

As previously discussed, the inputs to the computer system include digital and analog signals. The digital signals include the open or closed condition of one of the four governor valves represented collectively by block 50, the blowdown valves represented by the block 51, the drain dump valve 52 and a running or non-running condition of each of each type of pump in the system such as the feedwater pumps, the heater drain pumps, the condensate pumps and the circulating water pumps. Although system performance calculations are predicated on all systems components being on line, the status of these components is presented to the operator to consider in evaluating the calculated values.

The analog inputs include the numerous pressure sensors represented collectively by block 54, the temperature sensors, block 55, the flow meters, block 56, the pump power measurements for the electrically operated pumps, block 57, and the pump heads 58. The flow meter signals are in the form of the pressure drop through the flow meter which is converted to flow in the computer after being corrected for temperature and pressure. Similarly, the pump heads are presented in terms of pressure differential.

The analog and digital inputs are separately connected to terminations 59 in the Input/Output (I/O) Processor of the P250. The Input/Output Processor provides the interfacing which coordinates the input and output functions with the operation of the central processing unit (CPU) 60. The I/O Processor is provided with 256 14-bit peripheral channels variously adapted for the transfer of information between the CPU of the computer and a variety of forms of peripheral equipment. In addition, the first 64 peripheral channels may each be combined with 64 word addresses for multiplexing to permit addressing for up to 4096 (64×64) 14-bit data words. The selection of a particular channel, and a particular address if appropriate, for either inputting or outputting data is performed by the programs which control the operation of the CPU. Coupling of the CPU to the selected channel and address for the transmitting of data is accomplished by the interface panel 62 in the I/O Processor under the command of the CPU.

Some of the peripheral channels are allocated to the digital inputs mentioned above. Since these inputs are generated by switches which indicate the off/on or open/closed condition of the associated equipment, they are referred to as contact closure inputs. Furthermore, since each input can be represented by one binary bit, 14 contact closure inputs may be read simultaneously by connecting one input to each of the 14 bits in a single peripheral channel. Periodically, a digital scan program in the CPU directs scanning and reading of each peripheral channel assigned to the contact closure inputs. The contact closure inputs may be multiplexed in systems having a large number of such inputs, however, the relatively few contact closure inputs in the instant system do not justify multiplexing.

Other peripheral channels are assigned to analog inputs. However, before these signals can be inputted, they must be transformed into digital signals recognizable by the CPU. This is accomplished by the analog system 63 which performs the additional task of multiplexing the numerous analog inputs. In the present case, the analog input systems include three analog to digital (A-D) convertors each capable of reading and converting 40 points per second for a combined capability of 120 points per second. The addressing information generated in the CPU couples the analog input systems to the appropriate input before each conversion and transmission. As in the case of the digital inputs, an analog scan program periodically scans and reads into the CPU each of the analog inputs.

Several peripheral channels are allocated to providing a link between the programmer's console located in the computer room and the CPU. The peripheral equipment provided at the programmer's console permits him to initially enter and subsequently modify the programs in the CPU and to monitor the operation of the computer system through the running of diagnostic programs. This equipment includes an input/output typewriter 64, a tape punch 65 and a tape reader 66.

Other peripheral channels permit communication between the CPU and the operator's panel located in the control room. The push button and display 67 give the operator flexibility in the operation of the monitoring system. For instance, he may initiate print out of the calculated results at times other than those called for automatically by the program, or he may call for readings or calculations not automatically printed out. The operator's panel incorporates three typewriters for recording information generated by the computer. The log typer 68 prints the programmed print outs such as the system and component performance calculations. The trend typewriter 69 prints the read outs called up by operator push button operation and the alarm typer 70 is reserved for printing out results which exceed established limits whereby the operator's attention is immediately directed to such information. The alarm system also generate visual signals at the operator's console to assure that the condition is not overlooked.

The P250 is capable of operating in connection with other peripheral equipment such as contact closure output systems and analog output systems, however, since the present invention relates basically to an evaluation and monitoring system, such peripheral equipment is not required. Of course, where the present invention shares the use of the computer with other systems such as process control systems, additional peripheral equipment may be required.

For greater detail on the P250 input/output system, reference should be made to a publication issued in October, 1969 by the Westinghouse Electric Corporation entitled "P250 Documentation-Vol. 5 STANDARD PROCESS I/O SYSTEMS" and referred to at TP104.

The CPU is the primary controlling device for most system functions. In addition to executing the computational instructions within the CPU, it controls the input and output functions discussed above. The P250 utilizes a 2.k word core memory and a 750K word external random access memory 71.

SYSTEM AND COMPONENT EVALUATION

The primary indicator of performance for a power generating cycle is the heat rate. Broadly stated, the heat rate is the amount of heat absorbed per unit of work done and for a thermoelectric power generation system, it is expressed in terms of BTU/kilowatt-hour. In effect, the heat rate is measure of power generating cycle thermal efficiency and as such is significant in economic evaluation of a given cycle. Not only is the heat rate an indication of cycle design efficiency, but an increase in the heat rate of an operating system is a reliable indication of deterioration or failure of system components. By combining periodic heat rate calculations with selected component performance calculations, a utility is provided with valuable information which can be used to schedule preventive maintenance and avoid catastrophic failures.

Various methods of calculating the heat rate of a cycle are in use and are distinguished by the portions of the cycle included in the calculations. For instance, gross turbine heat rate is concerned only with the heat consumed by the turbine, whereas net turbine heat rate also takes into account the power consumed by the boiler feed pump, and station heat rate takes into account every component in the plant. The particular formulation selected is a matter of choice, however, obviously only the calculations from like formulations can be compared.

Figure 6:
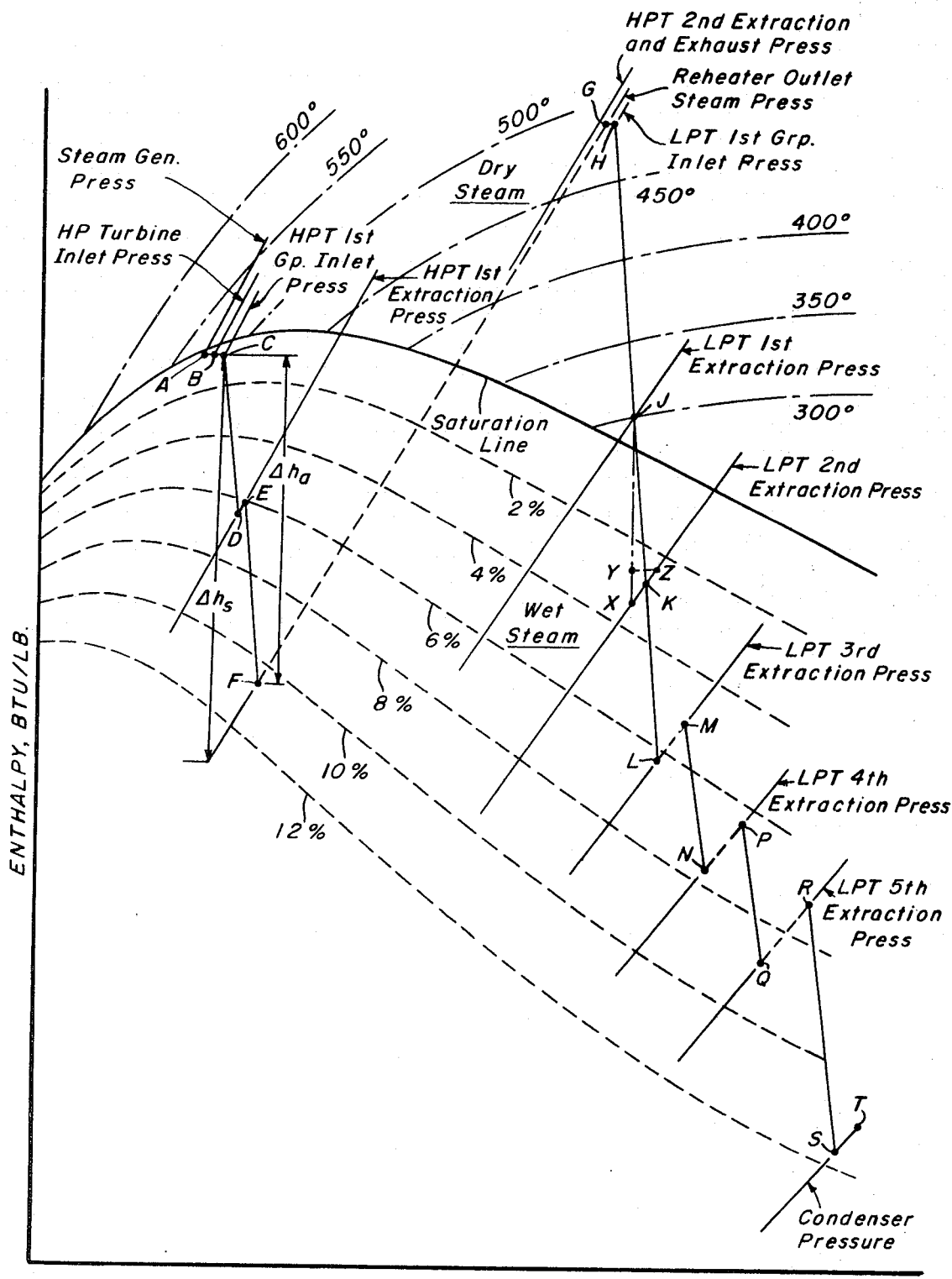
FIG. 6 is a Mollier Chart illustrating a typical expansion line plot for the turbine system illustrated in FIGS. 1–4.

As mentioned, the heat rate is an indication of the overall cycle efficiency. A more detailed analysis of cycle efficiency can be gained from the turbine expansion line. The expansion line is a plot on a Mollier chart of the state of the steam as it expands through the turbine. As is well known in the turbine field, a Mollier chart is a thermodynamic diagram in which the ordinate is enthalpy and the abscissa is entropy as illustrated in FIG. 6. The chart also contains the dome shaped saturation line under which the steam is wet and above which it is superheated. Curves of constant pressure are illustrated on the chart by the solid lines extending diagonally upward and to the right. Constant temperature lines for the superheated steam region are shown as breaking to the right from the saturation line. In the wet steam region, the pressure and temperature are inter-dependent and the constant temperature lines (not shown in this region) are essentially parallel with the constant pressure lines. This graphically illustrates the point made earlier that the state of wet steam cannot be determined merely by knowing the temperature and pressure as in the case of dry steam. In the wet region, an additional property, the moisture content, must be known before the state of the vapor can be determined. The moisture content is illustrated in FIG. 6 by the family of dotted curves under the saturation line labeled with the appropriate percentage of moisture content.

The expansion line for operating the turbine system disclosed in FIGS. 1 through 4 at 100 percent rated load is illustrated in FIG. 6. Point A represents the state of the steam delivered by the steam generator. For illustrative purposes, the steam at Point A could have a temperature of 518.9°F., a pressure of 895 psia and an enthalpy of 1197.5 btu/lb and a moisture content of 0.25. The high pressure turbine inlet pressure, Point B, is somewhat less due to supply line pressure loss, however, it can be seen that the enthalpy remains constant. The throttling effect of the high pressure turbine inlet valves causes the high pressure turbine first group inlet pressure to be slightly less than the inlet pressure.

The line from Point C to Point D represents the expansion of the steam in the first group of the high pressure turbine. This change of state is reflected in the application of torque to the turbine shaft as the thermal energy converted to kinetic energy. In the case of an isentropic expansion of the steam through the turbine, the line C-D would be vertical indicating an expansion process in which there is a change in enthalpy without an increase in entropy. The slope, however, is an indication of the thermal efficiency of the turbine section, as will be seen later.

At Point D the moisture content is approximately 6.3 percent. The removal of saturated liquid with the first extraction steam results in an increase in the specific enthalpy of the steam entering the second group and a slight improvement in the quality of the steam as represented by Point E.

The application of additional torque to the turbine shaft through the expansion of the steam in the second group of the high pressure turbine is represented by the line from E to F. It can be seen that this high pressure turbine exhaust and second extraction steam has a moisture content of over 10.5 percent. Mechanical removal of most of the moisture by the moisture separators and the application of additional heat to this vapor by the reheaters carries the expansion line well into the superheated region at Point G. Again, the throttling effect of the inlet valves of the low pressure turbine results in a slight pressure drop on the steam entering the first group of the low pressure turbine at Point H. Low pressure turbine first extraction steam, which is extracted in the state represented by the Point J, remains in the superheated region. Hence, the enthalpy of the steam can easily be determined from the extraction temperature and pressure.

Further expansion of the steam in the second group of the low pressure turbine operating at 100 percent load carries the expansion line into the wet region at Point K, however, since there is no moisture removal with the second extraction steam, the expansion line continues directly from Point K in a straight line through third group expansion to Point L. With light loads, Point K may remain in the dry steam region above the saturation line.

Low pressure turbine third group moisture removal brings the expansion line up to the Point M for steam entering the fourth group of the low pressure turbine, Fourth group expansion pulls the line down to Point N for the fourth extraction steam, while fourth group moisture removal brings it back up to Point P. Similarly, the expansion line drops to Point Q for fifth extraction steam and rises to Point R for sixth group inlet steam. After final expansion in the sixth group of the low pressure turbine, the expansion line end Point S is reached. At this point, the steam pressure has dropped to the condenser pressure which for the instant case is approximately 1.5 inches Hg Abs. The Point S represents the state of steam as it leaves the blades of the last stage of the low pressure turbine. Turbine end losses, which are reflected in a rise in enthalpy as the kinetic energy of the near supersonic exhaust steam is transformed into the internal energy of the static condenser steam, bring the expansion line up to the turbine end Point T.

The expansion line plot is useful in determining turbine efficiency. For instance, the efficiency of the high pressure turbine is calculated by first determining the change is enthalpy for isentropic expansion $\Delta h_s$ from the difference between the enthalpy at Point C and the point at which a vertical line from Point C intersects the high pressure turbine exhaust pressure line. The actual change in enthalpy $\Delta h_a$ is then determined by subtracting the enthalpy at Point F from that at Point C. The efficiency is the ratio of $\Delta h_a$ to $\Delta h_s$. The efficiency of the overall turbine combination of the low pressure turbine or even a selected group of a high pressure turbine or low pressure turbine can be determined in a similar manner. Changes in any of these efficiencies could indicate component failure or deterioration. Determination of the various state points will be discussed subsequently.

Analysis of other system components can also be made in an attempt to isolate the cause of a rise in the heat rate. Moisture separator performance is monitored by comparing the actual moisture removed with expected moisture removal for the particular operating conditions. Reheater performance is cross checked by comparing the actual terminal temperature difference, which is the difference between the inlet temperature of the reheat steam and the outlet temperature of the reheated steam, to the expected terminal temperature difference for current operating conditions. Similarly, individual feedwater heater performance is evaluated by monitoring heater terminal temperature differences. Condenser performance is indicated by a comparison of actual condenser vacuum to expected condenser vacuum.

The effectiveness of the electric powered pumps in the system is determined by the ratio of the hydraulic horse power developed by the pump to the electric power consumed multiplied the motor efficiency. In installations where the feedwater pumps are turbine driven, pump performance is evaluated by comparing input thermal power to a bogie FIGURE at rated plant load.

THE COMPUTER PROGRAM SYSTEMS

Figure 7:
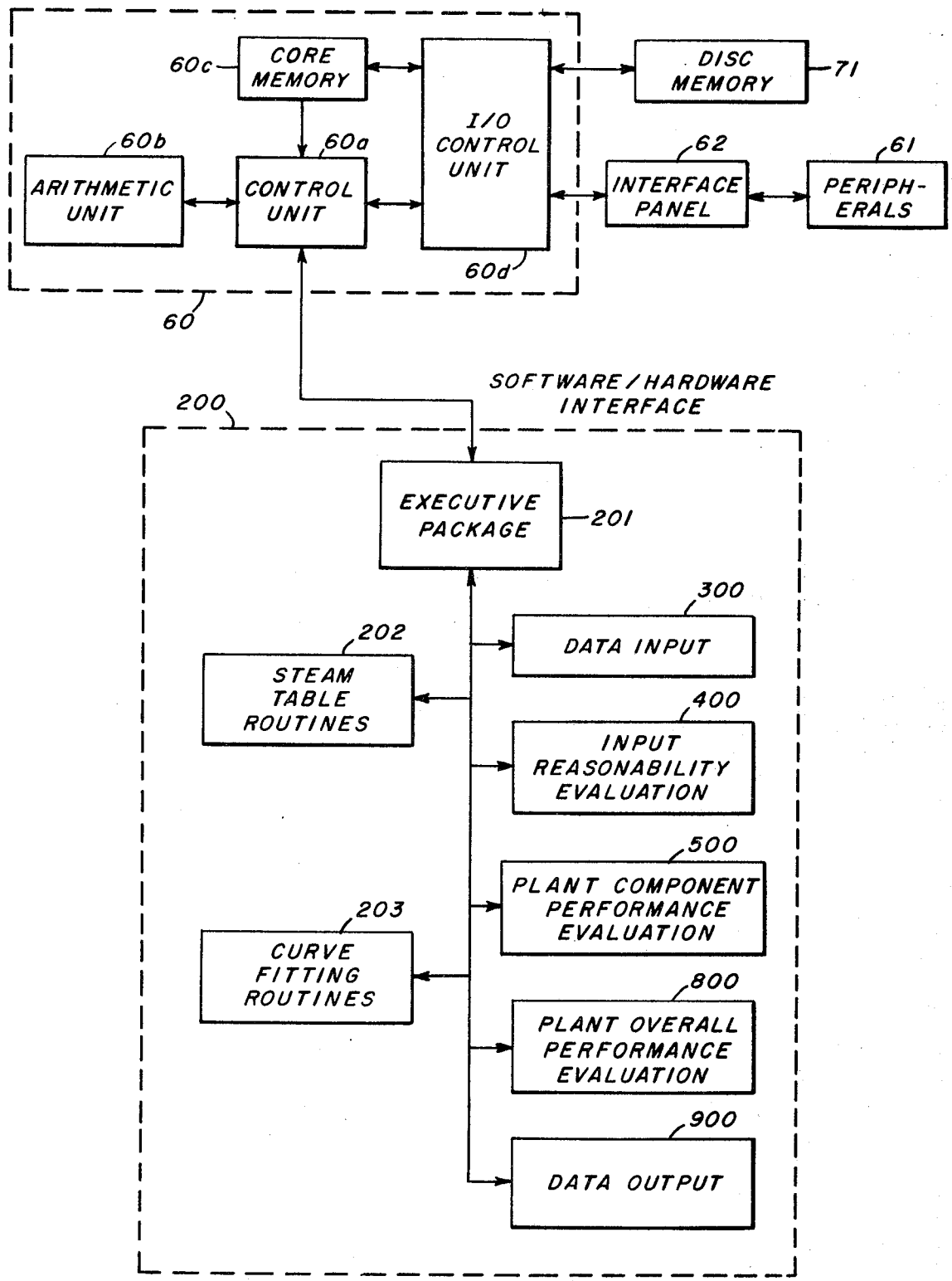
FIG. 7 is a block diagram illustrating the interfacing between the computer hardware of FIG. 5 and the computer software including the overall organization of the software.

On-line monitoring of system, component and instrumentation performance is performed by the digital computer 60 under control of a programming system 200 as illustrated in FIG. 7. The heart of the programming system is the executive package 201 which is operative through the control unit 60a of the CPU 60 to control the operation of the arithmetic unit 60b, the transfer of data between core memory 60c and the arithmetic unit, and the transfer of data between the CPU and external equipment such as disc memory 71, and the peripherals 61 through the CPU I/O control unit 60d and interface panel 62. In addition, the executive package controls the execution of the other programs in the program system 200. Various library subroutines are available for use with the executive package.

The on-line monitoring program system includes, in addition to the executive package, the following primary programs:

a. Data Input Program 300
b. Input Reasonability Evaluation Program 400
c. Plant Component Performance Evaluation Program 500
d. Plant Overall Performance Evaluation Program 800
e. Data Output Program 900.

In addition, the program system includes a library of steam table routines 202 and the curve fitting routine 203 which may be called up by the programs listed above. The steam table routines provide the computer with a means for determining the properties of water in a given state. Steam tables which list the properties of steam in tabular form are well known in the field of thermodynamics. The tables set forth in Keenan and Keys, Thermodynamic Properties of Steam have been used for many years and more recently the steam tables prepared by the American Society of Mechanical Engineers have gained wide acceptance. A detailed description of the development of steam table programs for digital computers is set forth in "Formulations of Iterative Procedures for the Calculation of the Properties of Steam," by R. D. McClintock and G. J. Silvestri published by the American Society of Mechanical Engineers in 1968, Library of Congress card number 68-22685. Packaged steam table routines are availabe for purchase and have been used by turbine designers for some time now.

The steam table routines availabe in the P250 are set forth in the following table.

TABLE I

| NO. | IDENTIFIER | CALCULATES | UNITS | STATE OF WATER | INDEPENDENT VARIABLES | | |
|---|---|---|---|---|---|---|---|
| | | | | | 1 | 2 | 3 |
| 1 | TSLP | TEMPERATURE | °F | SATURATED LIQUID | PRESS | — | — |
| 2 | PSLT | PRESSURE | PSIA | SATURATED LIQUID | TEMP | — | — |
| 3 | HSLT | ENTHALPY | BTU/Lb | SATURATED LIQUID | TEMP | — | — |
| 4 | VSLT | SPECIFIC VOLUME | Ft³/Lb | SATURATED LIQUID | TEMP | — | — |
| 5 | SSLT | ENTROPY | BTU/°F.Lb | SATURATED LIQUID | TEMP | — | — |
| 6 | HSVP | ENTHALPY | BTU/Lb | SATURATED VAPOR | PRESS | — | — |
| 7 | VSVP | SPECIFIC VOLUME | Ft³/Lb | SATURATED VAPOR | PRESS | — | — |
| 8 | HCLTP | ENTHALPY | BTU/Lb | COMPRESSED LIQUID | TEMP | PRESS | — |
| 9 | VCLTP | SPECIFIC VOLUME | Ft³/Lb | COMPRESSED LIQUID | TEMP | PRESS | — |
| 10 | HSSTP | ENTHALPY | BTU/Lb | SUPERHEATED STEAM | TEMP | PRESS | — |
| 11 | VSSTP | SPECIFIC VOLUME | Ft³/Lb | SUPERHEATED STEAM | TEMP | PRESS | — |
| 12 | SSSTP | ENTROPY | BTU/°F.Lb | SUPERHEATED STEAM | TEMP | PRESS | — |
| 13 | ISDTPP | ISENTROPIC DROP H | BTU/Lb | SUPERHEATED STEAM | TEMP | PRESS | PRESS |
| 14 | HWSCSHPP | ISENTROPIC DROP H | BTU/Lb | WET STEAM | ENTHALPY | PRESS | PRESS |

The steam table identifier is followed by the property to be determined by that table, the units in which the property is calculated, the state of the water and the independent variable or variables which must be known in order to determine the desired property. It should be noted that the table identifier contains this information in coded form. The first letter identifies the dependent variable, the second and third letters, the water state, and the fourth and subsequent letters, the inputs that must be provided. For instance, the first table is used to determine the temperature of the saturated liquid at a given pressure. Some tables, such as Table No. 8, which is used to determine the enthalpy of the compressed liquid, require the input of two independent variables such as pressure and temperature in the given case. Other tables require three inputs, such as Table No. 13 for determining the change in enthalpy of superheated steam during isentropic expansion. In order to determine the isentropic enthalpy drop, the initial temperature and pressure and the final pressure must be available.

The curve fitting routine 203 gives the digital computer the capability to calculate the unknown one to two variables which are a continuous function of each other. The function is expressed in terms of an nth order polynomial equation with the value of n being determined by the complexity of the relationship between the variables. The development of the algorithm and the Fortran programming of the routine are discussed on pages 262–275 of a book by Daniel D. McCracken and William S. Dorn entitled "NUMERICAL METHODS AND FORTRAN PROGRAMMING WITH APPLICATIONS IN ENGINEERING AND SCIENCE," John Wiley and Son, Inc., New York, New York, 1964, Library of Congress card number 64-17147. This routine is useful in calculating an expected value of a parameter for a given system operating point from curves developed either theoretically or empirically and is used extensively in the programs to be discussed below.

It is standard practice in computer applications to first develop a numerical formula called an algorithm for solving the problem or causing the computer to function in a prescribed manner. The numerical formula must then be translated into a series of instructions which can be understood and carried out by the computer to be used. It is now common practice to write the instructions in one of several general computer languages which is later translated by a computer into the machine language of the particular computer. The general languages have been widely accepted because they permit the programmer to develop a program which is independent of any specific computer and because they relieve him of the tedium of writing detailed step by step instructions. A widely used general computer language is Fortran. For a discussion of the Fortran IV language which is the language used in describing the subject invention, see "A Guide To Fortran IV Programming" by Daniel B. McCracken, John Wiley & Son, Inc., New York, New York, 1965, Library of Congress card number 65-26848. One of the desirable features of the Fortran language is that most arithmetic operations are expressed in their common form. One difference is that multiplication is indicated by an asterisk. Another distinction is that summations are written in the form; Sum=Sum+$X_i$; however, the conventional $\Sigma$ format will be in the following description to conserve space.

Flow charts are a useful form of describing a computer program. They display in block diagram form the sequency of steps performed by the computer under the control of the program. Several levels of flow charts may be employed to describe the program in varying degrees of detail. For instance, a general flow chart can be used to outline the major divisions of the program, and a second level of flow chart may illustrate the chief subdivisions of these major divisions. Additional levels of flow charts may be provided under appropriate circumstances until the Fortran statements are reached.

In the more detailed flow charts to be discussed in describing the invention, the various parameters are identified by the following code which may be broken down into six parts. The first part, consisting usually of the first three letters, designates the piece of apparatus with which the parameter is associated and includes the following:

| | |
|---|---|
| AUX | = auxiliary equipment |
| CON | = condenser |
| COP | = condensate pump |
| CWP | = circulating water pump |
| FWP | = feedwater pump |

-Continued

| | |
|---|---|
| HDP | = heater drain pump |
| HEI | = heater (and number) |
| HPT | = high pressure turbine |
| LPT | = low pressure turbine |
| MS | = moisture separator |
| RH | = reheater |
| SG | = steam generator |
| TBG | = turbine-generator |

The second part of the identifier consisting of the next two digits is used, if required, to designate the particular part of the apparatus as follows:

1E = (number of) extraction
2G = (number of) group
M = motor

Third part, consisting usually of two letters, will appear fater the first part if it is not necessary to designate a part of the equipment. The third part indicates the state of the water as follows:

CO = condensate
CW = circulating water
FW = feedwater
S = steam

The fourth part indicates the direction of movement as follows:

I = in, into
O = out

The fifth part consisting of one to three letters indicates the type of value as follows:

| | |
|---|---|
| A | = average |
| C | = corrected |
| DEV | = deviation |
| DIFF | = difference |
| EX | = expected |
| R | = real or actual |
| T | = total |

The sixth and final part usually consisting of one letter indicates the variable as follows:

| | |
|---|---|
| C | = correction factor |
| E | = efficiency |
| F | = mass flow |
| G | = gross heat rate |
| GPM | = gallons per minute |
| H | = enthalpy |
| L | = level |
| M | = moisture content |
| ME | = motor efficiency |
| P | = pressure |
| U | = moisture removal effectiveness |
| R | = density |
| S | = entropy |
| T | = temperature |
| V | = specific volume |
| W | = volumetric flow |

A few additional codes used in special circumstances will be described at the appropriate point in the discussion.

A. Data Input Program

Figure 8:
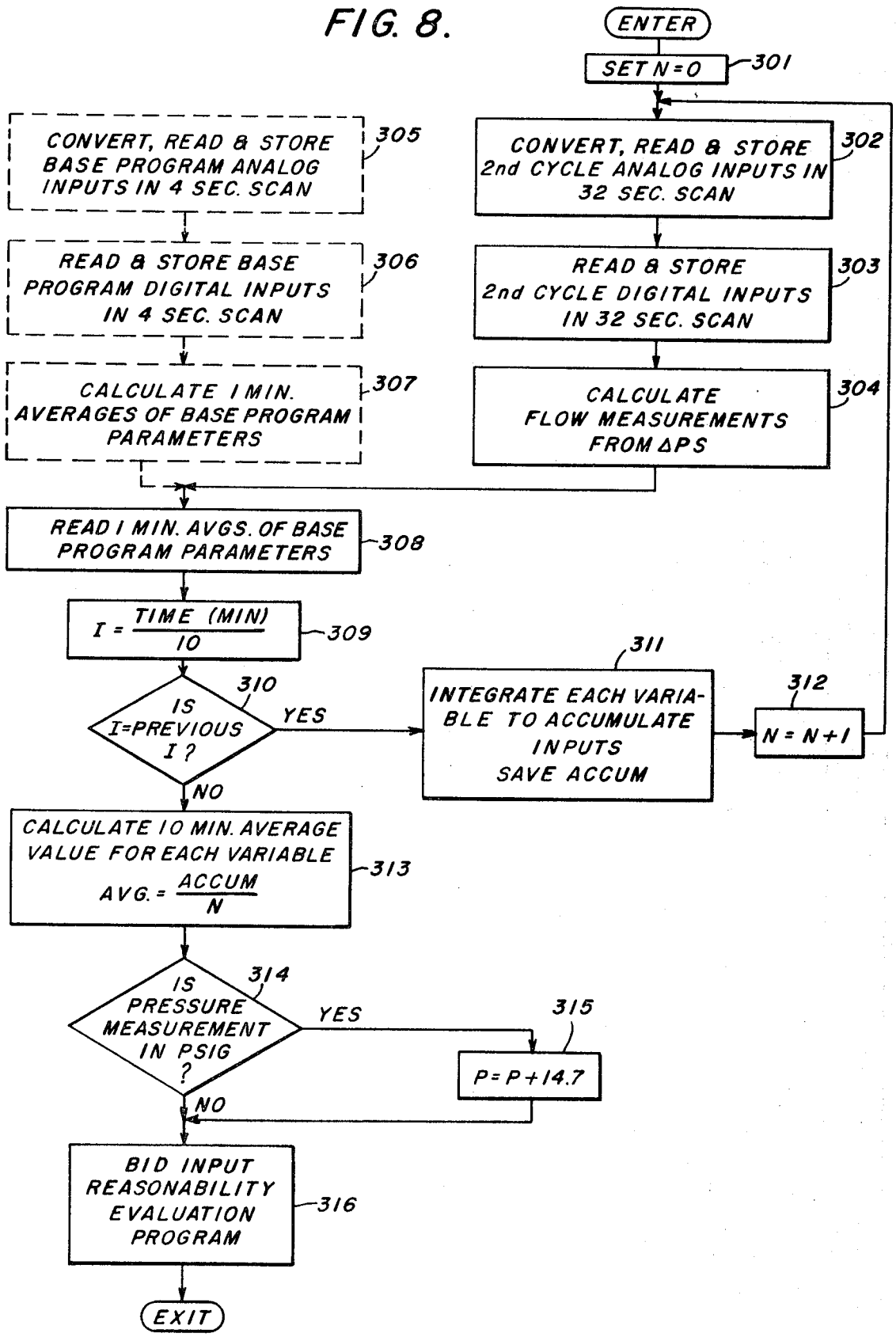
FIG. 8 is a schematic diagram of a flow chart for the data input program employed by the computer.

At an interval to be selected by the utility, typically on the order of every ten minutes, the data input program is bid by the executive program. A flow chart of this program is illustrated in FIG. 8. Initiation of the program causes a count N to be set equal to zero in block 301. Each of the secondary cycle analog signals will be converted to digital signals, read and stored in core memory as indicated by block 302. The secondary cycle digital inputs will also be read and stored in core memory as shown in block 303. In block 304 the pressure differentials recorded by the flow meters are converted into flow measurements.

The secondary cycle on-line monitoring system described herein is part of a package designed to monitor overall operation of the entire power generating system. Another part of the package, referred to as the base program, monitors nuclear reactor and steam generator performance. Due to the critical nature of that part of the system, the analog and digital inputs are scanned every four seconds as indicated in blocks 305 and 306 respectively. The base program then calculates the one minute averages of the base program parameters in block 307. The one minute averages of the base program parameters are read into the data input system in box 308.

A time check to indicate when the ten minute interval has expired is made in box 309 on each scan. Since I is an integer, it will remain equal to the previous I until ten minutes has elapsed. Thus after each scan of the inputs, I is checked to see if it is equal to the previous I in block 310. If it is, indicating that ten minutes has not yet elapsed, the values of each variable are integrated in block 311 with the ACCUM value of each input being saved. N is then made equal to N + 1 in block 312 and the program is ready to again scan the inputs when 32 seconds have elapsed.

It can be seen then that on each scan, the value of each parameter is added to the total of the previous values for the interval and N is incremented to indicate the number of measurements taken. When the ten minutes has elapsed so that I is not equal to the previous I in block 310, the ten minute average value for each variable is calculated in block 313 by dividing ACCUM for each variable by N.

In block 314, each pressure measurement is tested to see if it was recorded in pounds per square inch gauge. If so, the pressure is converted to pounds per square inch absolute by adding 14.7 to the average value in block 315. The final step of the program is to bid the input reasonability program in block 316.

B. Input Reasonability Evaluation Program

Figure 9:
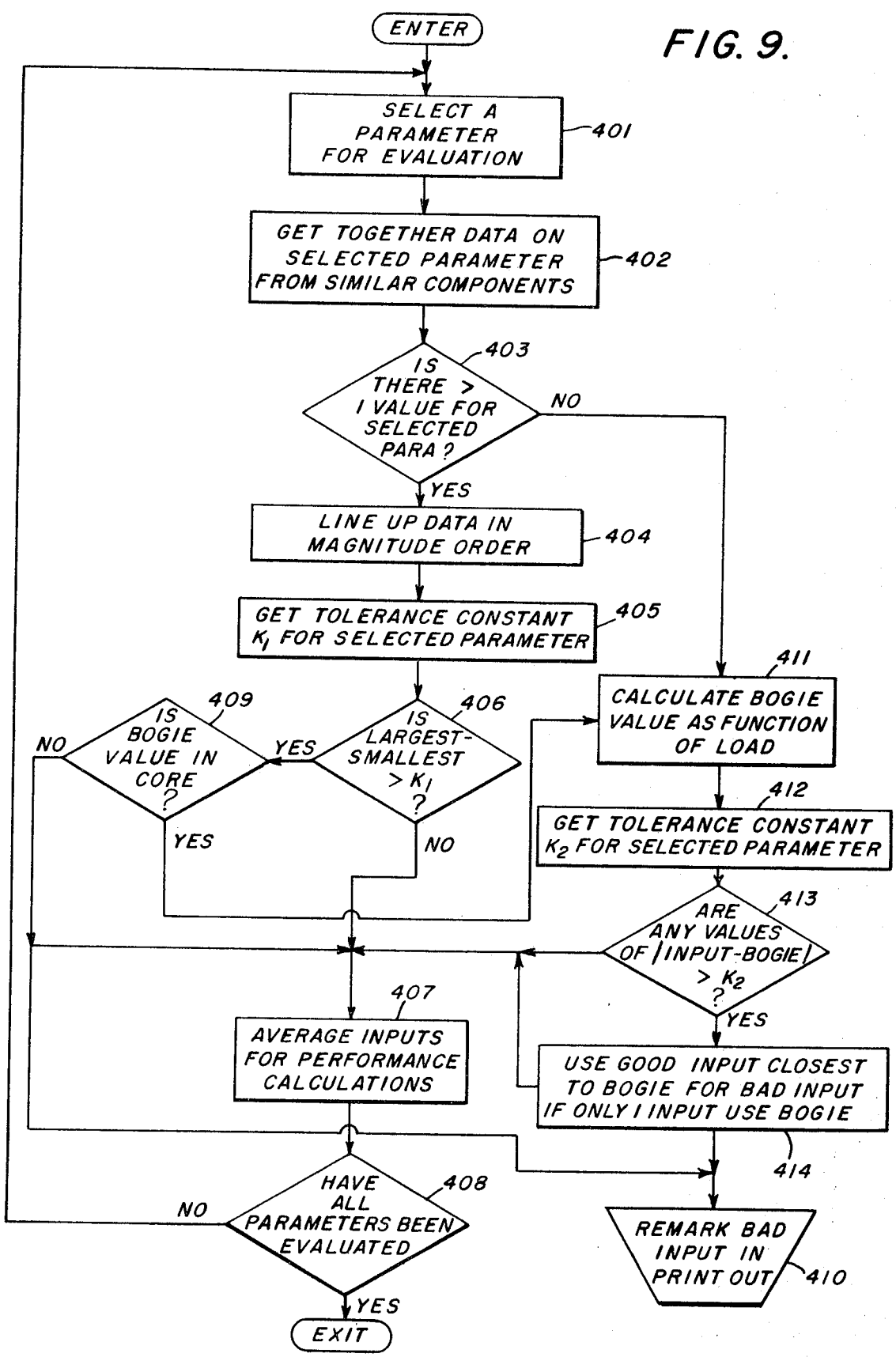
FIG. 9 is a schematic diagram of a flow chart for the input reasonability evaluation program employed by the computer.

The input reasonability evaluation program illustrated in block diagram form in FIG. 9 selects the 10 minute averaged value of the parameters one by one for evaluation in block 401. All values of the selected parameter are gathered together in block 402. For instance, if reheater drain temperature, RHEDT is being evaluated, the temperature reading from each of the six reheaters is assembled for evaluation.

If there is more than one value for the selected parameter as determined by block 403, a first test is initiated by lining up the data in magnitude order in block 404 and getting a tolerance constant K1 for the selected parameter from core memory in block 405. If the deviation between the largest and the smallest value of the selected parameter is less than constant K1 the inputs are averaged in block 407 for the performance calculations. If all the parameters have not yet been evaluated as determined by block 408, the program loops back to block 401 and selects another parameter.

If the spread between the largest and smallest value of the selected parameter exceeds K1, a check is made in block 409 to determine whether a bogie value is stored for the selected parameter so that the incorrect reading may be singled out. Bogie values are stored in core for all the parameters except those which depend upon ambient condition such as circulating water temperature and hence also condenser vacuum pressure. In those instances where a bogie value is not available, the inputs are averaged in block 407, however, the parameter is flagged in block 410 so that a remark may be recorded in the print-out.

In those instances where there is only one value for the selected parameter and in those instances where the group of readings have failed to pass the first test, the bogie value for the parameter is calculated as a function of load in block 411. Next the stored value for a second tolerance constant K2 for the selected parameter, is called up in block 412. Each value of the parameter is then compared with the bogie value in block 413. If the deviations of all values of the selected parameter from the bogie value do not exceed K2, then the readings are taken as acceptable even though they did not pass the first test and they are averaged in block 407 as previously discussed. The rationale here is that although two of the readings may disagree by more than a generally acceptable amount, if one reading is above and one below bogie, they can still be within acceptable values of bogie.

If the difference between any of the inputs and the bogie value exceeds K2, that value is rejected in block 414 and the closest value to bogie is substituted before the inputs are averaged. If there was only one input then it is rejected and the bogie value is used. In either case, the unacceptable reading is rejected and the bogie value is used. In either case, the unacceptable reading is remarked for print-out in block 410.

The program will continue to run until all of the parameters have been evaluated in the manner just described.

C. Plant Components Performance Evaluation Program

Figure 10:
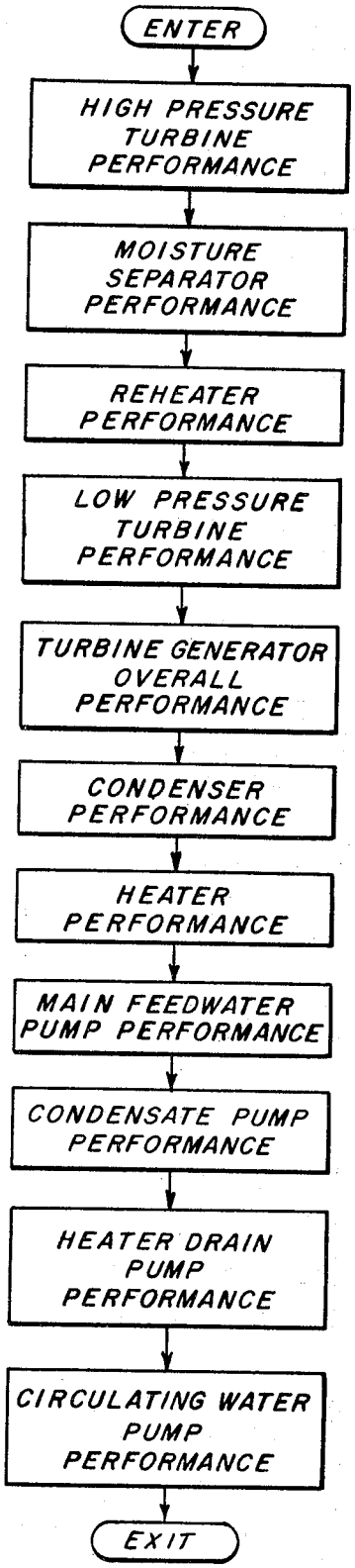
FIG. 10 is a schematic diagram of a flow chart illustrating the overall organization of the plant component performance evaluation program employed by the computer.

By far, the largest part of the program is directed to the evaluation of plant component performance. For this reason, the plant component performance evaluation program 500 is broken down into a number of sub-programs as illustrated in FIG. 10. Each of these sub-programs will be dealt with separately.

1. High Pressure Turbine Performance Sub-Program

Figure 11A:
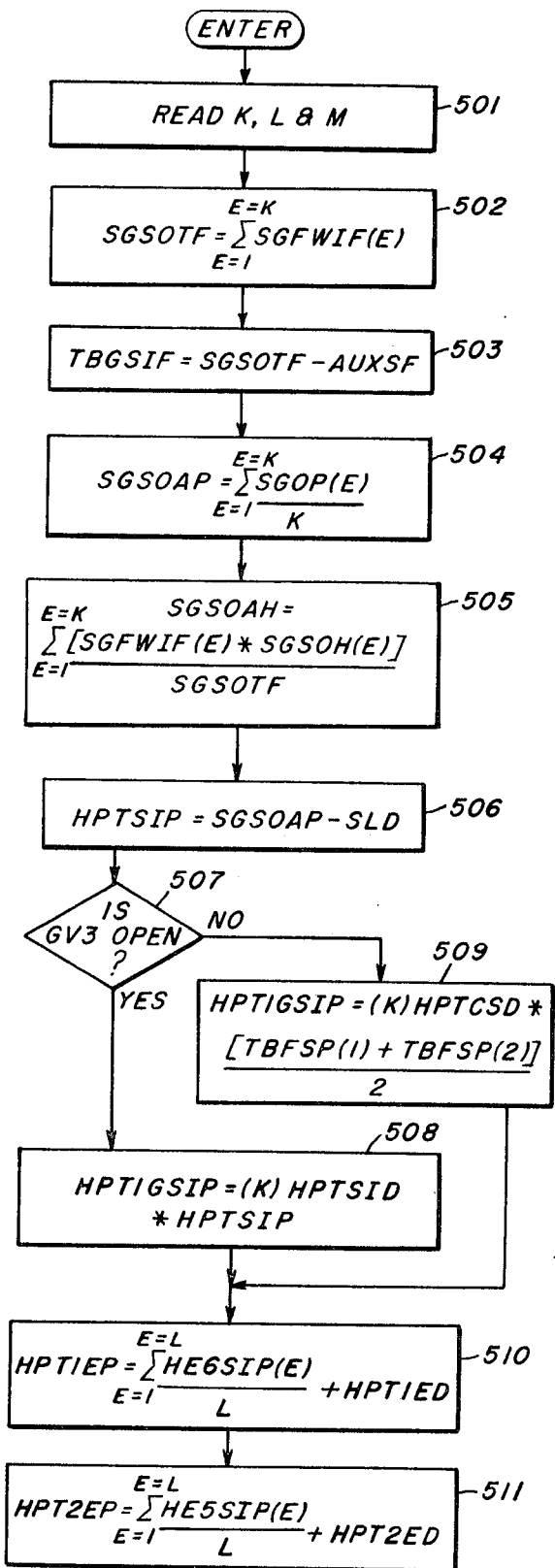
FIG. 11a–11c show a schematic diagram of a flow chart for the high pressure turbine performance sub-program of FIG. 10.
Figure 11B:
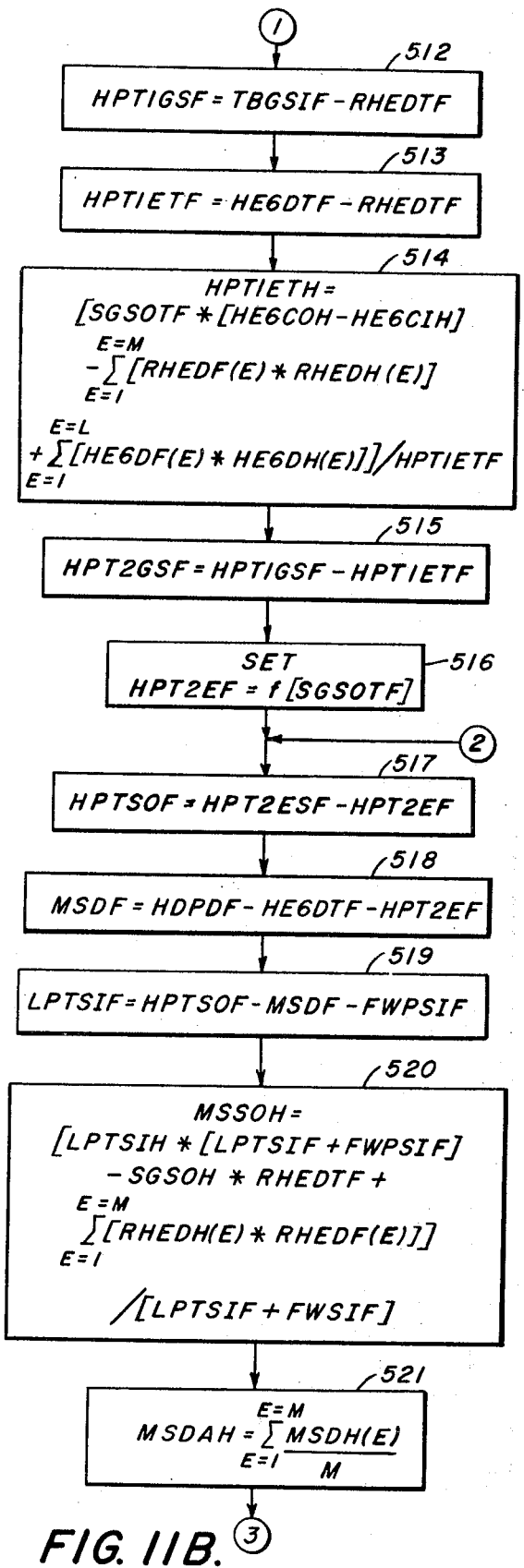

In evaluating the performance of the high pressure turbine, the sub-program calculates the high pressure turbine overall efficiency and compares this with the expected value for the given operating conditions. The contribution of the high pressure turbine to turbine shaft horsepower is also calculated by this sub-program. In generating the indicators of overall high pressure turbine performance, a great many intermediate parameters must be calculated. A number of these are helpful themselves in monitoring high pressure turbine performance, such as the extraction flows and enthalpies which are also useful in evaluating the performance of other components such as the moisture separators, the reheaters and the heater trains. The intermediate parameters may also be used to establish the turbine expansion line previously discussed under Plant And Component Performance Evaluation, supra. A detailed flow chart of the high pressure turbine performance sub-program is illustrated in FIG. 11. As a first step in block 501, the parameters K, L and M which indicate the number of steam generators, the number of heater trains and the number of reheaters respectively are read. For the system under discussion, K = 4, L = 3 and M = 6.

Next, the turbine inlet conditions are established. In block 502, the steam generator total flow is calculated by summing the flows of feedwater into each of the steam generators. It will be recalled from the discussion above that the large mass flow from the steam generators renders it difficult to measure the steam flow directly. Next, the steam flow into the turbine generator system is calculated in block 503 by subtracting the auxiliary steam flow flow from the total steam flow supplied by the steam generator. The steam generators steam outlet average pressure is then calculated in block 504 from the outlet pressure of each individual steam generator.

Next, the steam generator steam outlet average specific enthalpy is determined as a function of the weighted average of the steam supplied by each of the individual steam generators in block 505. The specific enthalpy of the steam generated by each individual steam generator is supplied by the base program. Since the generated steam is wet, these enthalpies must be calculated according to the following well known equation:

$$SGSOH = xh_g + (1 - x)h_f$$

Where $h_g$ is the enthalpy of the saturated vapor and $h_f$ the enthalpy of the saturated liquid at the given pressure and $x$ is the quality of the steam, which in the present case is approximately 0.9975.

The high pressure turbine steam inlet pressure is determined next by subtracting the steam line pressure drop, SLD, from the steam generator average pressure in block 506. SLD is determined from a stored curve as a function of the steam generator total flow through use of the curve fitting routine referred to above.

Calculation of the high pressure turbine first group steam inlet pressure is dependent upon whether governor valve GV3 is opened or closed. If GV3 is open, the first group steam inlet pressure is determined in block 508 by multiplying the high pressure turbine steam inlet pressure determined in block 506 by a constant, (K)HPTSID, which represents the throttling losses of the turbine inlet valves. If the governor valve GV3 is not yet open, the first group steam inlet pressure is determined in block 509 by multiplying the average first stage pressure measured in the impulse chambers by a second constant (K)HPTSSD, which represents the turbine control stage pressure ratio.

The high pressure turbine first extraction pressure is determined in block 510 by calculating the average pressure of the No. 6 heaters and adding to that a pressure drop, HPT1ED, which is calculated from a stored curve as a function of the average heater No. 6 pressure. In a similar manner, the high pressure turbine second extraction pressure is determined from the average heater No. 5 steam inlet pressure and a second extraction line drop in block 511. The numeral 1 in the circle following block 511 indicates that the program is continued at block 512 at the top of FIG. 11b where the numeral 1 again appears in a circle.

The high pressure turbine first group steam flow is calculated in block 512 by subtracting the reheater total drain flow from the turbine generator steam inlet flow. Next, the first extraction combined flow of steam and moisture is calculated by subtracting the reheater total drain flow from the heater No. 6 total drain flow in block 513. This formula represents a flow balance around the No. 6 heaters as is evident from FIG. 4.

The high pressure turbine first extraction moisture and steam combined specific enthalpy is computed in block 514 by performing a heat balance around the No. 6 heaters. In this heat balance, the total heat absorbed by the condensate or feedwater is calculated by multiplying the steam generator total flow, which will be remembered is the sum of the flows of feedwater into each of the steam generators, by the difference in the average specific enthalpy of the steam entering and leaving the No. 6 heaters. These enthalpies are determined from the compressed liquid steam routine No. 8 as a function of the feedwater pressure and the inlet and outlet feedwater temperatures. The total heat added by the reheater drain flow is determined by summing the products of the individual reheater drain flows and specific enthalpies. Similarly, the heat removed by the No. 6 heater drain flows is calculated through summation of the product of the individual heater drain flows and specific enthalpies. The reheater and No. heater drain enthalpies are determined from the saturated liquid steam routine 3 in Table I as a function of temperature. The first extraction total enthalpy is determined by subtracting the heat added by the reheater drains from the heat removed by the feedwater and by the No. 6 heater drain flows and dividing the total by the first extraction total flow.

The high pressure turbine second group steam flow is calculated next by subtracting the first extraction combined flow of moisture and steam from the first group steam flow in block 515.

The high pressure turbine second extraction flow cannot be calculated as easily as the first extraction flow since the No. 5 heaters, into which the second extraction flow is directed, are not provided with drain coolers and therefore their drain flows cannot be easily measured. Without a drain cooler, the drain flow is in the saturated liquid state and tends to flash back into steam as it passes through the venturi of the flow meter as previously mentioned. Since the high pressure turbine exhaust flow can also not be directly measured due to the large volumetric flow as previously discussed, some scheme must be devised to determine what proportion of the high pressure turbine second group flow is diverted to heater No. 5.

According to the invention, this dilemma is resolved by first assuming a high pressure turbine second extraction flow as in block 516. An assumed high pressure turbine steam outlet flow can then be calculated by subtracting the assumed second extraction flow from the second group flow in block 517. The moisture separator drain flow can also be calculated from the assumed second extraction flow in block 518 by performing a flow balance around the combination of the heater drain tank 33 and the No. 5 heaters since the heater drain pump drain flow and the No. 6 heater flows can be directly measured.

Having determined the moisture separator drain flow, the low pressure turbine steam inlet flow can be determined in block 519 by subtracting the moisture separator drain flow and the measured flow to the feedwater pump turbine (if the feedwater pump is turbine driven) from the high pressure turbine steam outlet flow. At this point, the moisture separator steam outlet enthalpy can be calculated by performing a heat balance around the reheaters in block 520 in a manner similar to that discussed in connection with block 514. Since the low pressure turbine steam inlet flow is superheated as a result of the reheating process, its enthalpy can be determined from the steam tables as a function of the average reheater steam outlet temperature and pressure. The enthalpy of the reheat steam entering the tube side of the reheaters is equal to the steam generators steam outlet enthalpy.

Figure 11C:
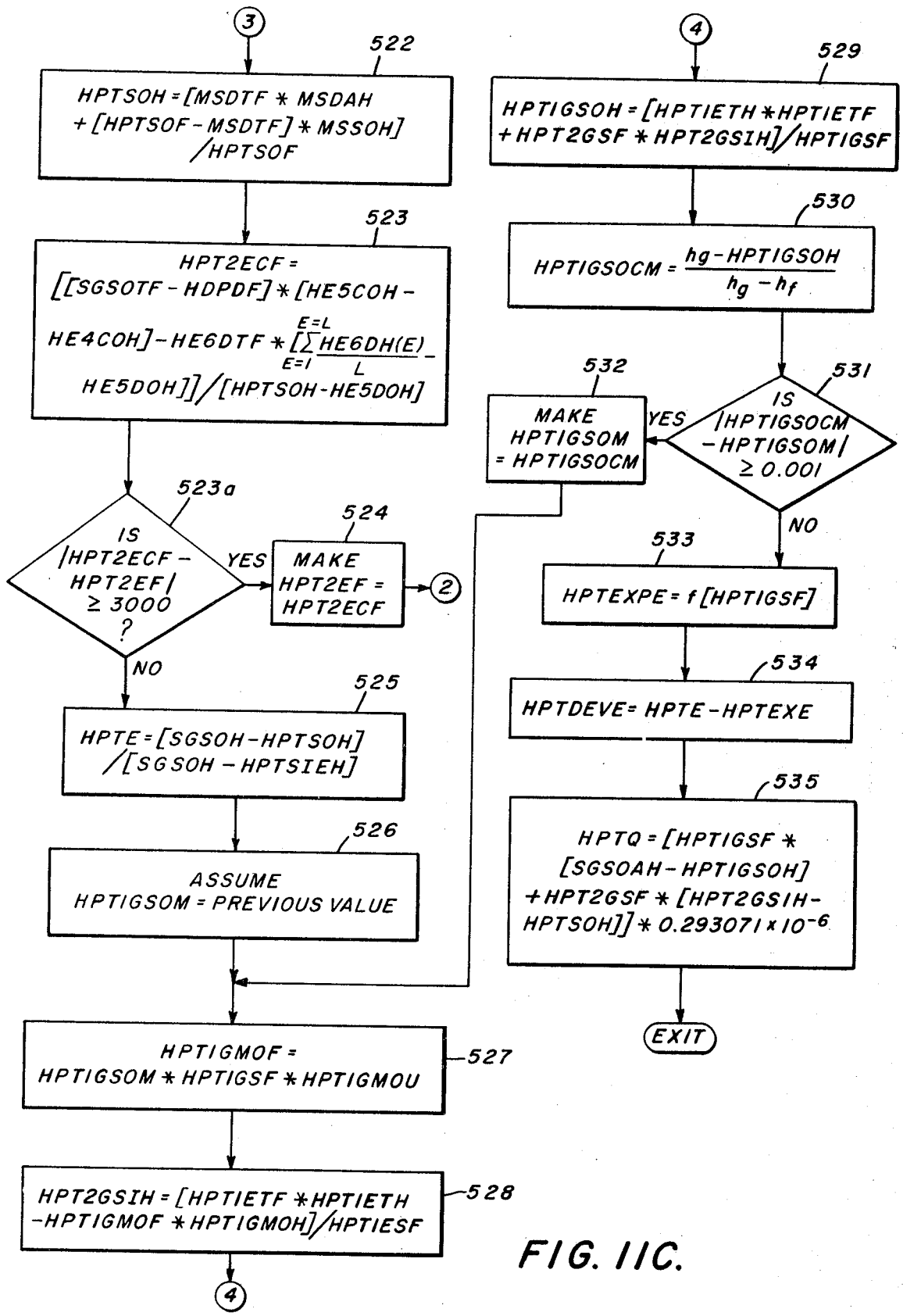

After the moisture separator average drain enthalpy is calculated in block 521 from the individual moisture separator drain enthalpies determined as a function of saturated liquid at the measured temperature from the steam tables, the high pressure turbine steam outlet enthalpy can be determined at block 522 in FIG. 11c, by performing a heat balance around the moisture separators.

Since the enthalpy of the high pressure turbine second extraction steam is the same as the high pressure turbine steam outlet enthalpy, a corrected value of the high pressure turbine second extraction flow can be determined in block 523 by performing a heat balance around the No. 5 heaters. Again, the condensate inlet and outlet enthalpies and the No. 5 heater drain enthalpies can be determined from the steam tables as a function of temperature. Since the No. 5 heater is on the suction side of the feedwater pump, the saturated liquid table is used in determining the condensate enthalpies.

The corrected high pressure turbine second extraction flow is then compared with the assumed flow and if the two values agree within 3,000 pounds per hour (which is less that ½ of 1 percent of the rated flow) the assumed value is accepted. If not, the assumed value is made equal to the corrected value in block 524 and the program jumps back to block 517 in FIG. 11b as indicated by the encircled numeral 2 at these two points in the flow chart. A new corrected second extraction flow is then calculated by the same process as was discussed above. The looping back continues until the solution converges. It has been found in practice that this usually requires three or four iterations.

Once the high pressure turbine second extraction flow has been calculated, the high pressure turbine overall efficiency can be calculated in block 525. As discussed in the section on System and Component Evaluation, supra, in connection with FIG. 6, the high pressure turbine efficiency is equal to the ratio of the difference in the enthalpy of the high pressure turbine inlet steam, which is equal to the steam generator steam outlet enthalpy, and the high pressure turbine steam outlet enthalpy, to the difference between the inlet enthalpy and the enthalpy resulting from isentropic expansion in the first and second groups of the high pressure turbine, or as expressed graphically in FIG. 6, the ratio of $\Delta h_a$ to $\Delta h_s$. The value of enthalpy which would result from an isentropic expansion in the high pressure turbine is calculated from the steam tables by first determining the entropy of the inlet steam as a function of inlet enthalpy and pressure and then determining the ideal final enthalpy as a function of the inlet entropy and the outlet pressure.

The next step in the evaluation of high pressure turbine performance is the determination of the points D and E on the expansion line of FIG. 6. Although the combined enthalpy of the first extraction mixed flow was determined in block 514, the first group steam outlet enthalpy and second group inlet steam inlet enthalpy represented by points D and E respectively, cannot be determined without knowing the porportion of the first extraction flow which is removed moisture. Since the moisture content of the first extraction flow cannot be measured directly, indirect means of establishing a relative proportion of steam and removed moisture in the first extraction flow must be devised.

According to the invention, a value is assumed for the high pressure turbine first group steam outlet moisture content. In block 526, it is assumed to be equal to the first group steam outlet moisture content calculated for the previous ten minute interval. A value can then be calculated for the high pressure turbine first group moisture removal flow in block 527 by multiplying the first group steam flow by the assumed moisture content and by the high pressure turbine first group moisture removal effectiveness factor, HPT1GMOU, which is calculated from a stored curve as a function of the high pressure turbine first extraction pressure. Since the high pressure turbine second group steam inlet enthalpy is then equal to the enthalpy of the proportion of the first extraction flow which is steam, its value may be determined in block 528 by setting up a heat balance equating the high pressure turbine second group steam inlet enthalpy to the total heat extracted by the mixed extraction flow minus the heat extracted by the removed moisture divided by the first extraction steam flow, which is equal to the first extraction mixed flow minus the first extraction moisture flow.

The high pressure turbine first group steam outlet enthalpy can then be calculated by setting up a balance equating the desired value to the total heat extracted by the first extraction mixed flow and the heat received by the second group divided by the first group steam flow in block 529. Knowing the high pressure turbine first group steam outlet enthalpy, a corrected value of the high pressure turbine first group steam outlet moisture content can be determined according to the formula of block 530 since $h_g$ and $h_f$, the enthalpies of saturated vapor and saturated liquid respectively at the first extraction pressure, are available from the steam tables. This corrected value of first group steam outlet moisture content is compared with the assumed value in block 531. If the two values deviate by more than 0.001, the assumed moisture content is made equal to the corrected value in block 532, and the steps of blocks 527 though 531 are repeated until the deviation is within 0.001.

Next, the high pressure turbine expected efficiency is determined in block 533 as a function of the first group steam flow from a stored curve. The deviation in the high pressure turbine efficiency can then be calculated in block 534 by subtracting the expected value from the calculated value.

As a final step, the high pressure turbine ideal shaft horsepower is calculated in block 535 by determining the product of the change in enthalpy for each group times the associated group flow, adding the two products together and multiplying by a conversion factor. In terms of FIG. 6, the high pressure turbine first group flow is multiplied by the difference in enthalpy in the points C and D and is added to the product of the second group flow times the change in enthalpy between the points E and F with the sum being multiplied by the appropriate conversion factor.

2. Moisture Separator Performance Sub-Program

Figures 12, 13:
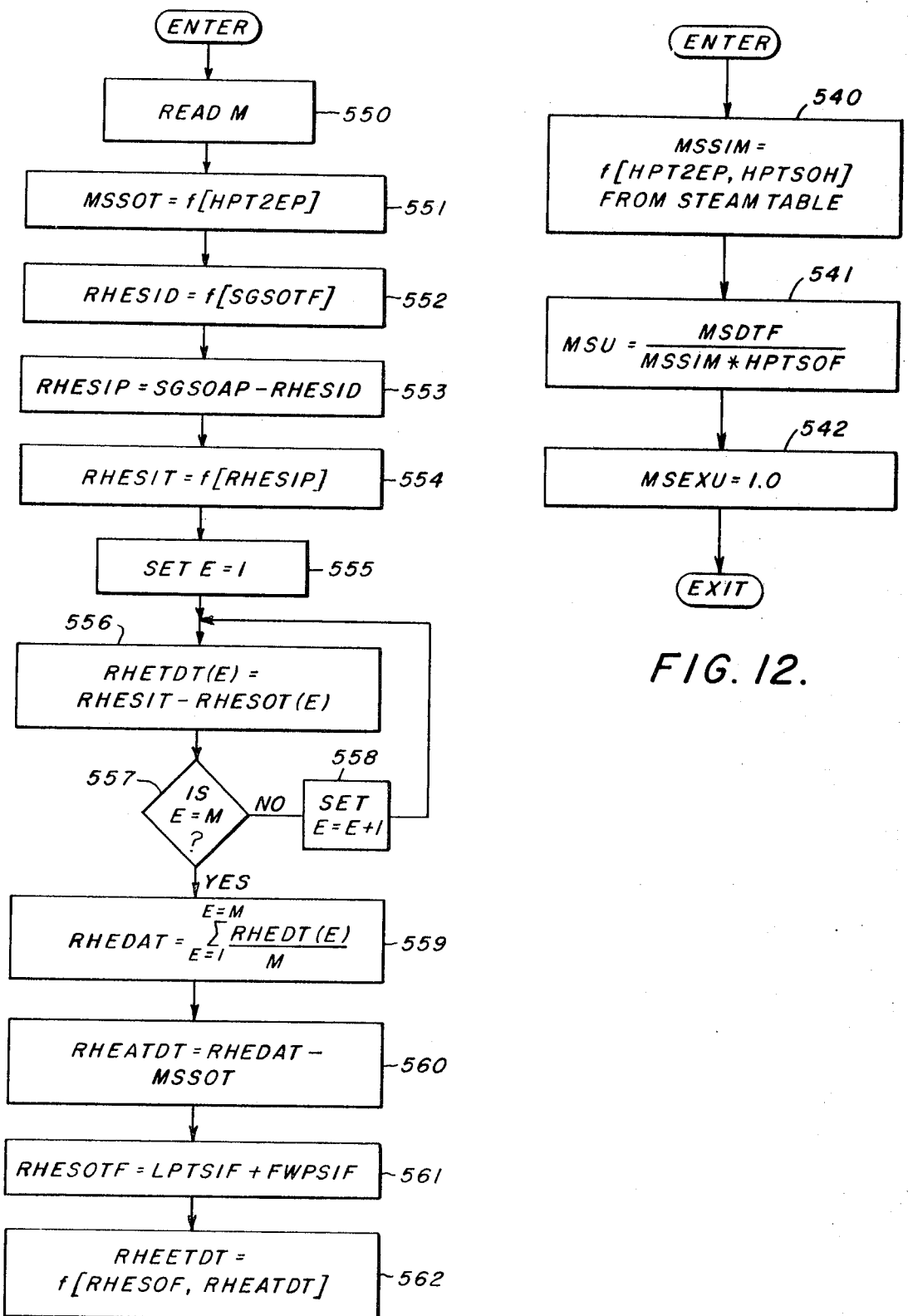
FIG. 12 shows a schematic diagram of a flow chart for the moisture separator performance sub-program of FIG. 10.
FIG. 13 illustrates a schematic diagram of a flow chart for the reheater performance sub-program of FIG. 10.

Referring to the flow chart of FIG. 12, it can be seen that moisture separator performance is evaluated by first calculating the moisture content of the steam entering the moisture separators in block 540 as a function of the high pressure turbine second extraction pressure and high pressure turbine steam outlet enthalpy from the steam tables. The moisture separator effectiveness is then calculated in block 541 by determining the ratio of the actual moisture removed to the amount of moisture present in the steam entering the moisture separators. The latter is determined by mulitplying the high pressure steam outlet flow by the moisture separator steam inlet moisture content. This calculated moisture separator effectiveness and the expected moisture separator effectiveness of 1.0 in block 542 are printed out side-by-side by the data output program for comparison by the operator. It would be a simple matter to provide an extra step for determining the deviation of the actual moisture separator effectiveness from the expected value.

3. Reheater Performance Sub-Program

The Reheater Sub-Program illustrated in flow chart form in FIG. 13, first reads the number of reheaters, M, in block 550. M is equal to six in the system under discussion. Next the moisture separator steam outlet average temperature is calculated from the steam tables as a function of the high pressure turbine second extraction pressure in block 551. The reheat steam inlet pressure is then calculated by first determining the reheat steam line loss, RHESID, as a function of the steam generator total flow in block 552 and then subtracting this line frop from the steam generator average pressure in block 533. The temperature of the reheat steam entering the reheaters from the steam generator can then be calculated in block 554 as a function of the reheater steam inlet pressure from the steam tables.

In order to determine the terminal temperature difference for each reheater, a variable E is set equal to 1 in block 555. The terminal temperature difference of the first reheater can then be determined in block 556 by subtracting the temperature of the reheated steam leaving the first reheater from the reheat steam inlet temperature. The reheated steam is the steam which is passed on to the low pressure turbine while the reheat steam condenses in the reheater tubes and is routed into the number 6 heaters. In block 557, a check is made to see if E is equal to M. If not, E is made equal to E+1 in block 558 and the calculation of block 556 is repeated for each reheater. The terminal temperature difference for each reheater is separately presented to the operator by the data output program.

When E becomes equal to M indicating that all the terminal temperature differences have been calculated, the reheater drain average temperature is calculated in block 559. By subtracting the moisture separator steam outlet temperature from the average reheater drain temperature in block 560, the reheater approach terminal temperature difference is determined. The reheater steam outlet total flow which is calculated in block 561 as the sum of the low pressure turbine steam inlet flow and the feedwater pump steam flow is sued in block 562 along with the reheater approach terminal temperature difference calculated in block 560 to determine the reheater expected terminal temperature difference from a stored curve in block 562.

4. Low Pressure Turbine Performance Sub-Program

Although there are three low pressure turbines operating in parallel, they are considered together in the evaluation of low pressure turbine performance. It is the efficiencies of the overall turbine combination and the major component groups which are of interest since isolation of the major component group responsible for a deterioration in overall performance is adequate for determining a course of corrective action.

Figures 14A, 14B:
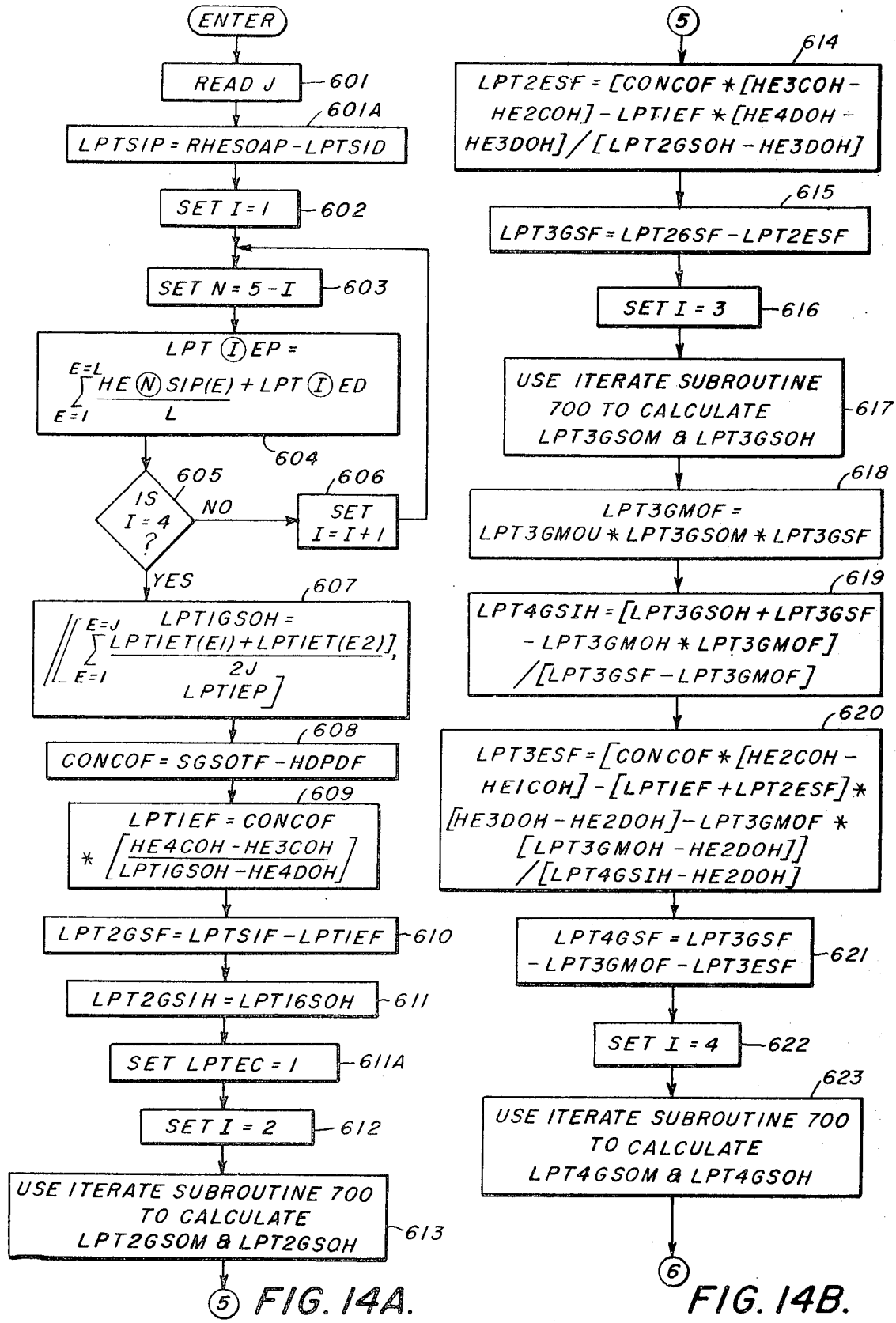
FIGS. 14a–14e show a schematic diagram of a flow chart for the low pressure turbine performance sub-program of FIG. 10.
Figures 14C, 14D:
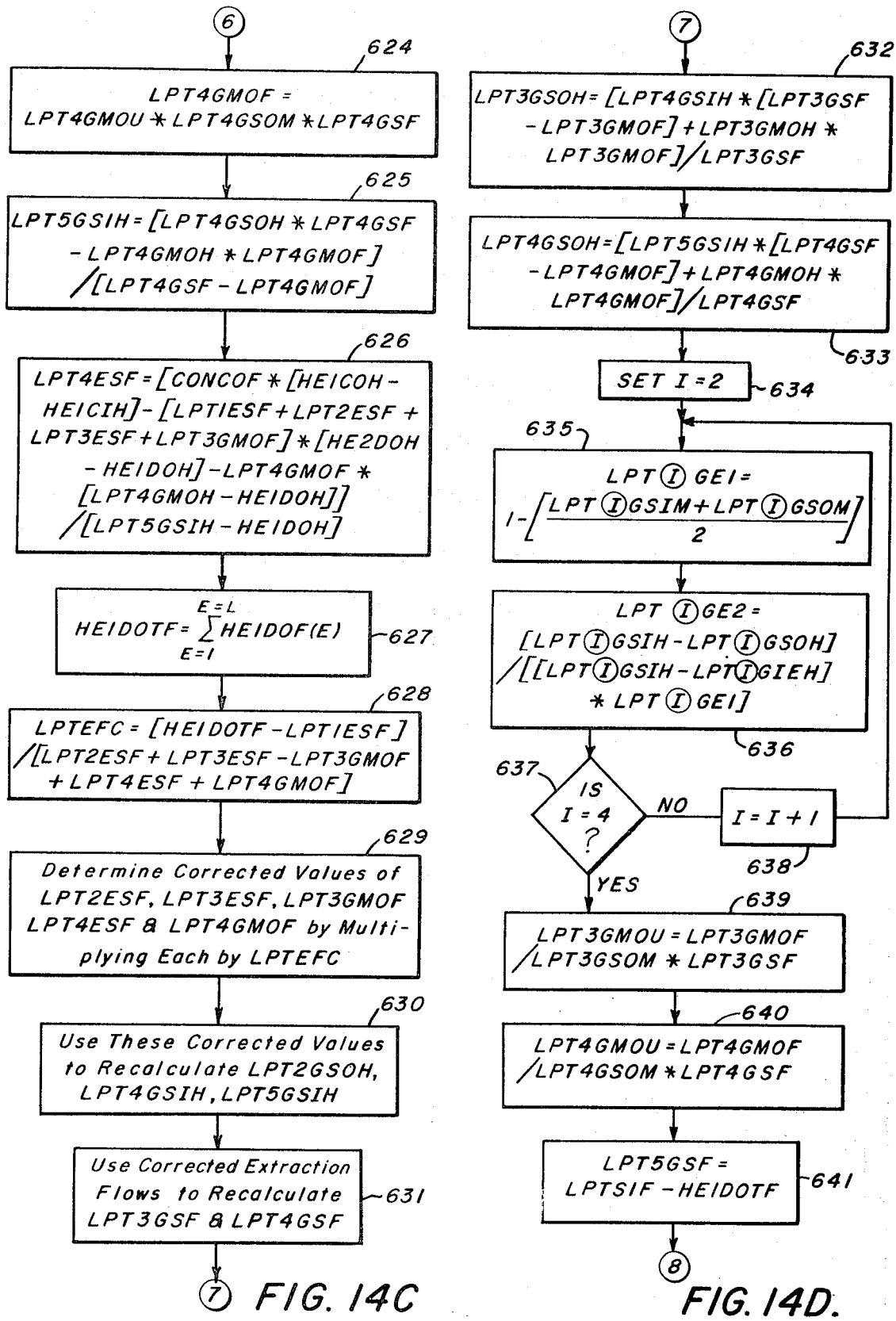
Figure 14E:
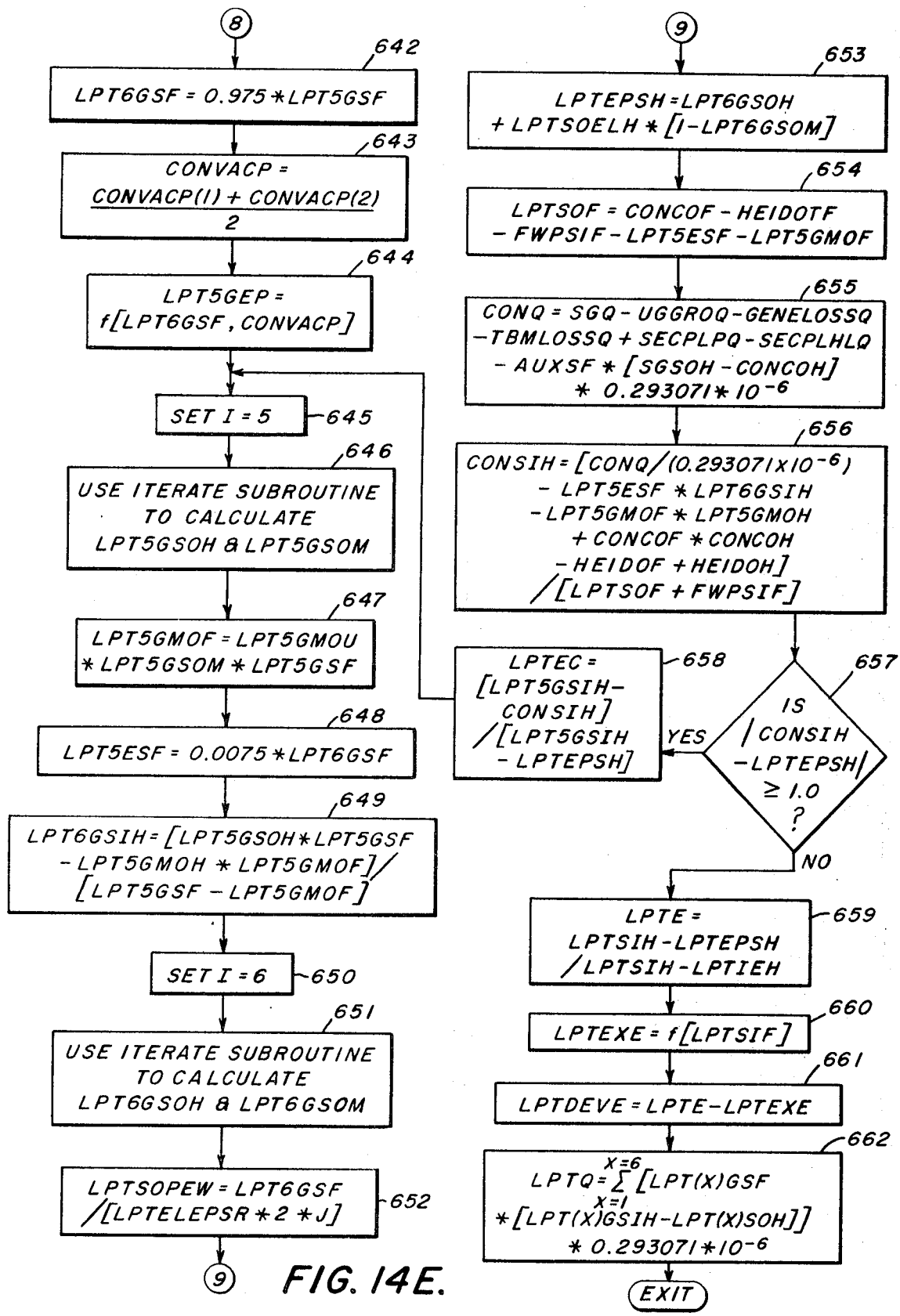

After the variable J, which represents the number of low pressure turbines, is read in block 601, of FIG. 14a, the low pressure turbine steam inlet pressure is calculated in block 601A by subtracting the low pressure turbine steam inlet line frop, LPTSID, from the average reheater steam outlet pressure previously calculated in connection with block 520 of the high pressure turbine sub-program. LPTSID is calculated from a stored curve as a function of the average reheater steam outlet pressure.

The next step in the low pressure turbine sub-program is to calculate the first through fourth low pressure turbine extraction pressures in blocks 602 through 606. Block 602 sets an integer I equal to 1, and block 603 sets a second integer N equal to 5-I. In block 604 it will be seen that the integer I represents the selected extraction and the integer N represents the heater into which the selected extraction is directed. For instance, with I equal to 1, N will be equal to 4 and the first extraction pressure is calculated by calculating the average heater No. 4 steam inlet pressure and adding to it the first extraction line drop which is determined from a stored curve as a function of the average heater steam inlet pressure. In block 605 a check is made to see if all four extraction pressures have been calculated. If not, I is made equal to I+1 in block 606 and the process is repeated until the requisite number of extraction pressures have been calculated.

Since the low pressure turbine first extraction steam remains superheated, its enthalpy can be determined from the steam tables in block 607 as a function of the extraction temperature and pressure. The average low pressure turbine first extraction temperature is calculated by adding together the temperature reading from each half of each low pressure turbine and dividing by 2J where J is equal to 3, the number of low pressure turbines.

The first extraction flow is determined by performing a heat balance around the No. 4 heaters in block 609, but first the flow of condensate through the No. 4 heaters must be determined in block 608 by subtracting the heater drain pump drain flow from the steam generator total flow. In the heat balance of block 609, the heat gained by the condensate, calculated by multiplying the condensate mass flow times the change in enthalpy of the condensate as it passes through heater No. 4, is equal to the heat given up by the first extraction flow, which is equal to the first extraction mass flow times the change in enthalpy of the extraction steam as it condenses in the heater. The heater No. 4 condensate outlet enthalpy and the heater No. 3 condensate outlet enthalpy, which is the same as the heater No. 4 condensate inlet enthalpy, are determined from the saturated water steam tables as a function of their respective temperatures. The heater No. 4 drain outlet enthalpy is also calculated from the steam tables as a function of measured temperature.

The low pressure turbine second group steam flow is calculated in block 610 by subtracting the first extraction flow from the low pressure turbine steam inlet flow. In block 611, the second group steam inlet enthalpy is made equal to the first group steam outlet enthalpy since there is no moisture removal with the first extraction steam.

Iteration Routine

The next step is to calculate the enthalpy of the steam leaving the second group of the low pressure turbine. As discussed previously, the difficulty in analyzing the performance of a turbine operating with wet steam is that the enthalpy cannot be determined without knowing the moisture content. The problems involved in measuring the moisture content of wet steam have also been discussed. The calculation of the moisture content of the high pressure turbine first group outlet steam and second group inlet steam was described in detail in connection with block 526 through 532 of the high pressure turbine performance sub-program illustrated in FIG. 11. However, in making those calculations, the high pressure turbine first extraction flow was available as a measured quantity. Reference to FIG. 4 will show that in accordance with one of the objectives of the invention, which is to minimize the instrumentation required, separate flow measurements of each of the low pressure turbine extractions are not taken. Therefore, the scheme used to calculate the moisture content and enthalpies of the steam in the high pressure turbine cannot be applied to the low pressure turbine. In its place an interation routine, is utilized to calculate the moisture content and enthalpy of the outlet steam of the second through fourth groups of the low pressure turbine. These calculated values and the calculated value of the low pressure turbine first group outlet enthalpy are proportionally adjusted in accordance with the total extraction flow from the first four groups of the low pressure turbine as measured by the heater No. 1 drain flows (See FIG. 4). The iteration routine can be called up by the low pressure turbine performance program each time there is a requirement to calculate a group moisture content and enthalpy.

Figure 23:
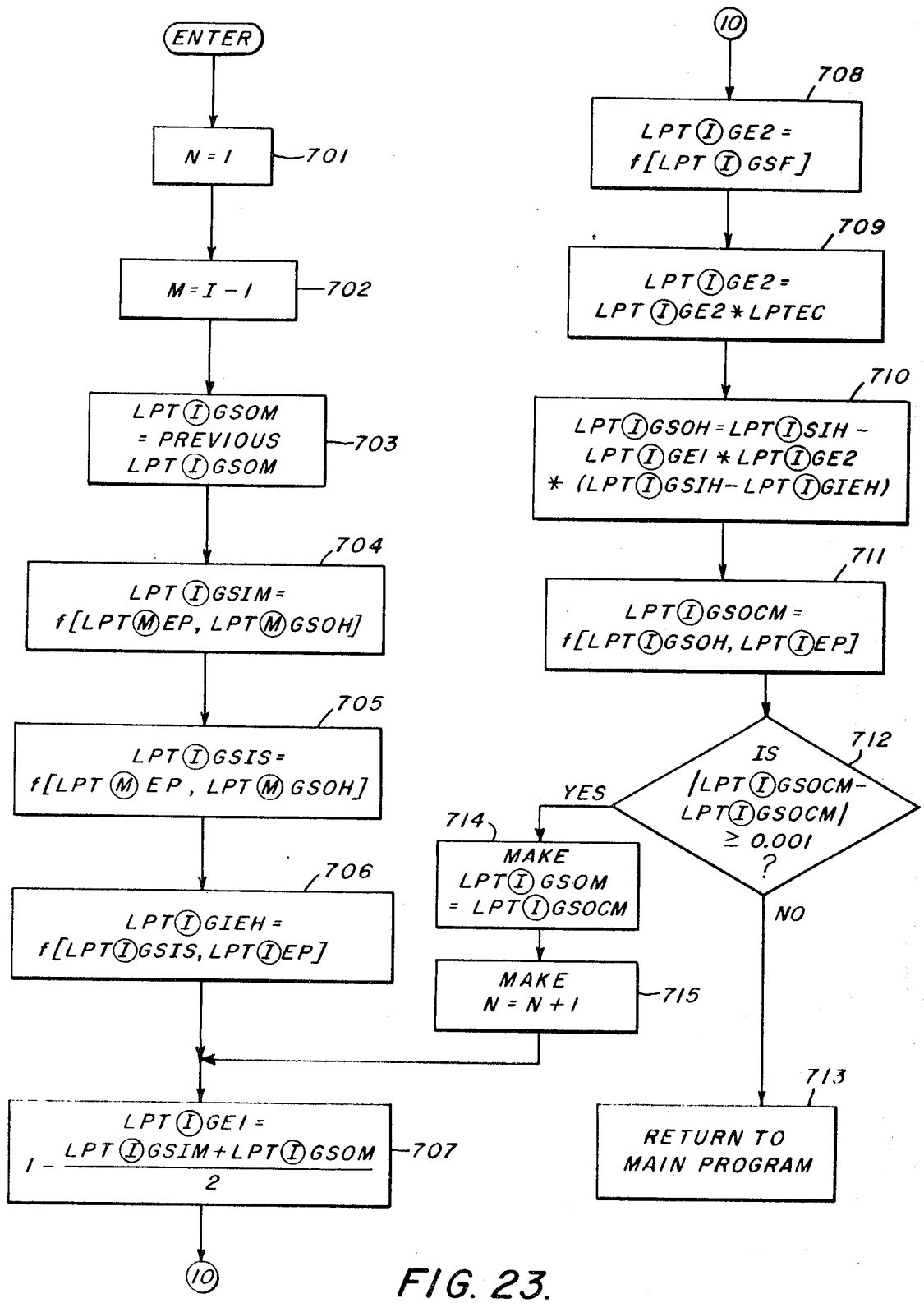
FIG. 23 shows a schematic diagram of a flow chart for the iteration sub-routine utilized by the low pressure turbine performance sub-routine shown in FIGS. 14a–14e.

Before the iteration routine is called up in block 613 to calculate the low pressure turbine second group steam outlet moisture content and enthalpy, the low pressure turbine efficiency correction factor is set equal to 1 in block 611A and the integer I is made equal to 2 in block 612. A flow chart for the iteration routine is shown in FIG. 23. The program is initiated by setting the integer N equal to one in block 701 and the integer M equal to I−1 in block 702. As was discussed in connection with the calculation of the low pressure turbine extraction pressures in block 604 above, the numerical values for I and M are inserted wherever the associated letter appears encircled in the remainder of the routine. Thus, since I equals 2 at this point, the low pressure turbine second group steam outlet moisture and enthalpy are being calculated. Accordingly, the second group steam outlet moisture content is assumed to be equal to the previous value in block 703. In block 704, the second group steam inlet moisture content is determined from the steam tables as a function of the first extraction pressure and first group steam outlet enthalpy. Since the steam entering the second group of the low pressure turbine is superheated, the moisture content will be equal to zero. In block 705, the second group steam inlet entropy is also determined from the steam tables as a function of the first extraction pressure and first group steam outlet enthalpy. The properties of the steam entering the low pressure turbine second group are represented graphically by the point J in FIG. 6. Next, the final enthalpy of the second group steam, were it to be subjected to isentropic expansion, is calculated in block 706 from the steam tables as a function of the second group steam inlet entropy and the second extraction pressure. The properties of the steam under these conditions would be represented by the point X in FIG. 6.

In block 707, a second group wet steam correction factor, LPT2GE1, is calculated as being equal to one minus the average second group moisture content. Since the second group steam inlet moisture content is equal to zero, E1 for the second group will be equal to one minus one-half of the assumed second group steam outlet moisture content. Following the encircled 10 to block 708, we find that the second group dry steam thermal efficiency, LPT2GE2, is determined from a stored curve as a function of the second group steam flow. A corrected value for the second group dry steam thermal efficiency is calculated in block 709 by multiplying it by the low pressure turbine efficiency correction factor. An assumed value of the second group steam outlet enthalpy can now be calculated in block 710 by multiplying the $\Delta h$ for an isentropic expansion in the second group (represented by the vertical distance between points J and X in FIG. 6) by the corrected dry steam second group thermal efficiency factor E2 and the wet steam correction factor E1 and then subtracting this $\Delta h$ corrected for actual conditions from the second group inlet enthalpy. This calculated value of enthalpy would intersect the line between J and X at point Y in FIG. 6.

A corrected value of the second group steam outlet moisture content can then be calculated in block 711 from the steam tables as a function of the value of second group steam outlet enthalpy just calculated and the second extraction pressure. Graphically, this is represented by the point Z in FIG. 6.

This corrected value of the second group steam outlet moisture is then compared with the assumed value in block 712. If the magnitude of the difference between the two values of second group steam outlet moisture content is within 0.001, control is returned to the main program as indicated by block 713. If the difference in values is equal to or exceeds 0.001, the assumed value is made equal to the corrected value in block 714, N is made equal to N+1 in block 715 and a new corrected value is calculated beginning at block 707. This process is repeated until the assumed and corrected values of the second group steam outlet moisture content are within the prescribed limits. The integer N indicates the number of iterations carried out. It should be appreciated that a corrected value of the second group steam outlet enthalpy is calculated in block 710 during each iteration. This final value is the one used in subsequent calculations.

Returning to the low pressure turbine performance sub-program at block 614, the second extraction steam flow can be calculated by performing a heat balance around heater No. 3. The heat given up by the second extraction flow, which is determined by multiplying the flow by the difference between the extraction steam enthalpy and the heater drain enthalpy, is equal to the heat gained by the condensate water, which again is determined by multiplying the condensate flow by the change in enthalpy of the condensate across heater No. 3, minus the heat given up by the drain water from heater No. 4, which is determined by multiplying the first extraction flow by the difference in enthalpy between the heater No. 4 drain water and the heater No. 3 drain water. Again the enthalpy of the condensate and the drain water can be determined from the steam tables as a function of temperature. The third group steam flow is calculated by subtracting the second extraction steam flow from the second group steam flow in block 615. The third group steam outlet moisture content and enthalpy can then be determined by setting I equal to 3 in block 616 and calling up the iteration routine just described as indicated in block 617.

Since moisture removal means are provided at the third extraction point, both moisture flow and steam flow must be calculated. The moisture flow is calculated in block 618 by multiplying the third group steam flow by the third group moisture content to determine the amount of moisture present and then multiplying this product by the third group moisture removal effectiveness, LPT3GMOU, which is determined from a stored curve as a function of third extraction pressure.

Next, the fourth group steam inlet enthalpy, which is the same as the third group extraction steam enthalpy, is calculated in block 619 by performing a heat balance around the third extraction point. The heat extracted by the moisture removed at the third extraction point is subtracted from the heat available after the steam has expanded in the third group. The enthalpy of the fourth group inlet steam and third extraction steam is then determined by dividing the heat remaining by the combined flow of fourth group steam and third extraction steam, the latter of which is equal to the third group steam flow minus the moisture removed. This enthalpy and the third extraction pressure establish the point M on the expansion line of FIG. 6. The proporation of the third group steam flow which becomes third extraction steam flow is determined in block 620 by performing a heat balance around the No. 2 heaters. This heat balance is similar to the heat balance performed around the No. 3 heaters in block 614 except, that the heat contributed by the second extraction flow and the third group moisture removed must also be considered in the equation.

The fourth group parameters are calculated in a manner similar to that in which the third group values were determined. In block 621, the fourth group steam flow is calculated by subtracting the third group moisture removed in addition to the third extraction steam from the third group steam flow. A fourth group steam outlet moisture content and enthalpy are determined by setting I equal to 4 in block 622 and running the iterate sub-routine 700 in block 623. The fourth group moisture removal flow and fifth steam inlet enthalpy are calculated in blocks 624 and 625 respectively in a manner which should be clear from the discussion of blocks 618 and 619. Similarly, the fourth extraction steam flow is calculated in block 626 by performing a heat balance around No. 1 heaters in a manner which should be understood from the similar calculations performed in blocks 614 and 620.

Now that the first through fourth low pressure turbine extraction flows have been calculated, it is possible to check the accuracy and make adjustments in the calculations just completed, by comparing the sum of the calculated flows with the measured drain flow from the No. 1 heaters (see FIG. 4). The total heater No. 1 drain flow is calculated in block 627 by summing the flows from each No. 1 heater. The low pressure turbine extraction flow correction factor can then be calculated in block 628. Since the first extraction flow can be determined fairly accurately in block 609, it is taken as correct and subtracted from the measured total heater No. 1 drain flow so that deviations will only be attributed to the second through fourth extractions. The correction factor is determined by dividing the resultant measured flow by the sum of the second through fourth calculated extraction flows including the third and fourth group removed moisture. Corrected values of the second through fourth extraction steam flows and the third and fourth moisture removal flows are determined in block 629 by multiplying each by the correction factor. These correctef flows are then used in block 630 to recalculate LPT2GSOH, LPT4GSIH and LPT5GSIH through rearrangement of the equations in block 614, 620 and 626 respectively. They may also be used in block 631 to recalculate LPT3GSF and LPT4GSF according to the equations of blocks 615 and 621 respectively. The third group steam outlet enthalpy, which was originally calculated through the iteration routine at block 617, is recalculated in block 632 by performing a heat balance around the third extraction point. Similarly, the fourth group steam outlet enthalpy is recalculated in block 633 by performing a heat balance around the fourth extraction.

Next, the low pressure turbine efficiencies are recalculated for the second through fourth groups. This is initiated by setting I equal to 2 in block 634. The group wet steam correction factors are then recalculated in block 635 using the same formula as in block 707 of the iteration routine except that the group inlet and outlet moisture content are recalculated from the steam tables as a function of the revised group steam outlet enthalpies and extraction pressures. The low pressure turbine group dry steam efficiencies E2 which were originally calculated at block 708 in the iteration routine as a function of the group steam flow from a stored curve, are recalculated in block 636 by determining the ratio between the difference in inlet and outlet enthalpy to the difference in inlet and isentropic expansion enthalpy multiplied by the wet steam correction factor E1. The process is repeated for groups 2 through 4 through operation of blocks 637 and 638 in a manner obvious from previous discussion.

The third group moisture removal effectiveness is then calculated in block 639 as being equal to the ratio of the third group moisture removed to the third group steam flow multiplied by the third group steam outlet moisture content. The fourth group moisture removal effectiveness is similarly recalculated empirically in block 640. The fifth group steam flow is calculated in block 641 by subtracting the total heater No. 1 drain flow from the low pressure turbine steam inlet flow. The sixth group steam flow is then calculated as a fixed design proportion of the fifth group steam flow in block 642. The condenser vacuum pressure is then calculated in block 643 as the average of the two condenser vacuum reading. At this point, the fifth group extraction pressure can be calculated in block 644 as a function of the fifth group steam flow and the condenser vacuum pressure from a family of stored curves.

The fifth group steam outlet enthalpy and moisture content are then calculated from the iterate subroutine in block 646 after setting I equal to 5 in block 645. The fifth group moisture removed can then be calculated in block 647 in a manner similar to that used in block 618 to determine a third group moisture removal flow. The fifth group extraction steam flow is calculated in block 648 as a fixed fraction of the sixth group steam flow. At this point, the sixth group steam inlet enthalpy can be determined in block 649 by performing a heat balance around the fifth extraction point. The sixth group outlet enthalpy and moisture content are then calculated through blocks 650 and 651. In block 652, the low pressure turbine volumetric exhaust flow per end in cubic feet per hour is calculated as being equal to the sixth group steam flow divided by the density of the steam at the low pressure turbine expansion line end point, LPTELEPSR, determined from a stored curve as a function of the condenser vacuum pressure and the sixth group outlet steam enthalpy, multiplied by J, the number of low pressure turbines, and by 2 since each low pressure turbine has two ends. The low pressure turbine point steam enthalpy is then calculated in block 653 by adding to the sixth group steam outlet enthalpy, the increase in the enthalpy of the steam as it flows from the near supersonic speed leaving the last stage of the turbine blades to near zero in the condenser, LPTSOELH, multiplied by the quality of the exhaust steam. LPTSOELH is calculated from a stored curve as a function of the low pressure turbine volumetric exhaust flow per end. The low pressure turbine exhaust flow is calculated in block 654 by subtracting the heater No. 1 total drain flow, the feedwater pump steam flow, the fifth extraction steam flow and fifth extraction moisture flow from the condenser condensate flow.

In order to refine the measurements made for the fifth and sixth groups, it is desirable to make an independent determination of the condenser steam inlet enthalpy which should be equal to the low pressure turbine end point steam enthalpy calculated in block 653. This is done by performing a heat balance around the condenser. However, since as mentioned earlier, it is difficult to measure the large volume of circulating water passing through the condensers so that the heat rejected to the circulating water by the condenser can be calculated as a product of the change in the enthalpy of the circulating water supplied by the flow, a total plant heat balance is performed first to find the heat rejected to the circulating water by the condenser. This total plant heat balance is performed in block 655 wherein the total heat rejected by the condenser is calculated by adding to the total heat supplied by the steam generator, SGQ, the power contributed by the secondary plant pumps, SECPLPQ, and subtracting the generator gross electric output, UGGROQ, the generator electric losses, GENELOSSQ, the turbine and generator mechanical losses, TBMLOSSQ, the radiation loss, SECPLHLQ, and the heat consumed by the auxiliary systems. The latter term is calculated by multiplying the auxiliary steam flow by the change in enthalpy of the auxiliary steam and by a conversion factor. Generator electric loss and secondary plant pump total power are calculated from stored curves as a function of generator gross electric output. The turbine and generator mechanical losses and radiation losses are constant and assumed to be independent of load. Having calculated the total heat rejected by the condenser, the condenser steam inlet enthalpy can be calculated in block 656 by performing the heat balance around the condensers in the manner previously discussed with respect to heat balances. The condenser steam inlet enthalpy is than compared with the turbine end point steam enthalpy in block 657. If they deviate by 1 btu per pound or more, the low pressure turbine fifth and sixth group dry steam efficiency correction factor is calculated in block 658 as the ratio of the differences between the fifth group steam inlet enthalpy and the condenser inlet enthalpy to the difference between the fifth group inlet enthalpy and the turbine end point enthalpy. The program thus loops back to block 645 to recalculate the fifth and sixth group parameters.

When the condenser steam inlet enthalpy and the turbine end point enthalpy agree within 1 but per pound, the program advances to block 659 where the low pressure turbine overall efficiency is calculated by dividing the difference between the low pressure turbine steam inlet enthalpy and the end point enthalpy by the difference between the low pressure turbine steam inlet enthalpy and the low pressure turbine exhaust enthalpy which would result from an isentropic expansion. This latter enthalpy is calculated by first determining the low pressure turbine first group steam inlet entropy from the steam tables as a function of inlet pressure and enthalpy and then determining the isentropic expansion enthalpy from the steam tables as a function of the steam inlet intropy and the condenser vacuum pressure, in the same manner in which the high pressure turbine overall efficiency was determined. The low pressure turbine expected efficiency is then calculated in block 660 from a stroed curve as a function of the low pressure turbine inlet flow. The deviation is the low pressure turbine efficiency can then be calculated in block 661 by subtracting the expected value from the actual value. Finally, the low pressure turbine ideal shaft horsepower is calculated in block 662 by summing the products of group flow multiplied by the change in enthalpy for the associated group and multiplying the result by the appropriate conversion factor.

5. Turbine Generator Overall Performance Sub-Program

Figure 15:
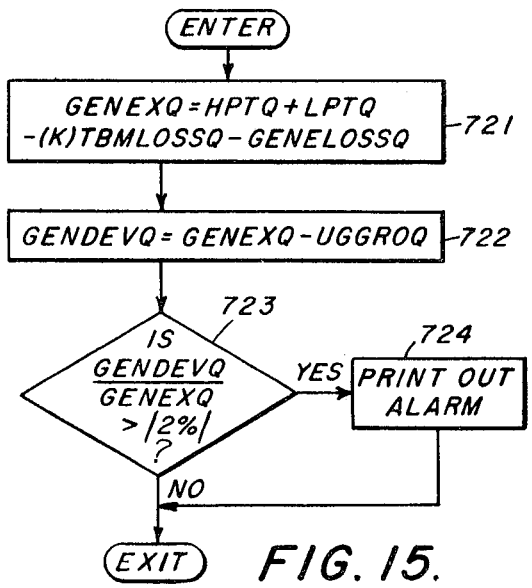
FIG. 15 shows a schematic diagram of a flow chart of the turbine generator overall performance sub-program of FIG. 10.

The flow chart for the turbine generator overall performance sub-program is shown in FIG. 15. The turbine generator expected power output is calculated in block 721 by adding the high pressure turbine shaft horsepower to the low pressure turbine shaft horsepower and subtracting the turbine and generator mechanical losses and the generator electric losses. The deviation in the generator power output can then be determined by subtracting the generator gross electric output from the expected generator output in block 722. If the deviation in power output is more than 2 percent of the expected power output as determined in block 723, an alarm is printed out in block 724.

6. Condenser Performance Sub-Program

Figure 16:
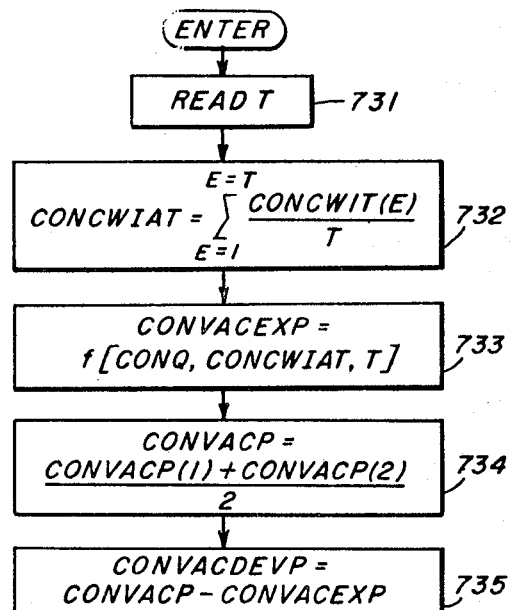
FIG. 16 shows a schematic diagram of a flow chart for the condenser performance sub-program of FIG. 10.

The condenser performance sub-program illustrated in block diagram form in FIG. 16 is initiated by setting T equal to the number of circulating water pumps running in block 731. The average circulating water inlet temperature is then calculated in block 732 so that the condenser vacuum expected pressure can be calculated in block 733 as a function of the heat rejected by the condenser, the circulating water inlet average temperature and the number of pumps running from a family of curves stored in the computer. After the condenser vacuum actual pressure is computed in block 734 as the average between the two pressure readings, the deviation in condenser vacuum pressure is computed in block 735.

7. Heater Performance Sub-Program

Figure 17:
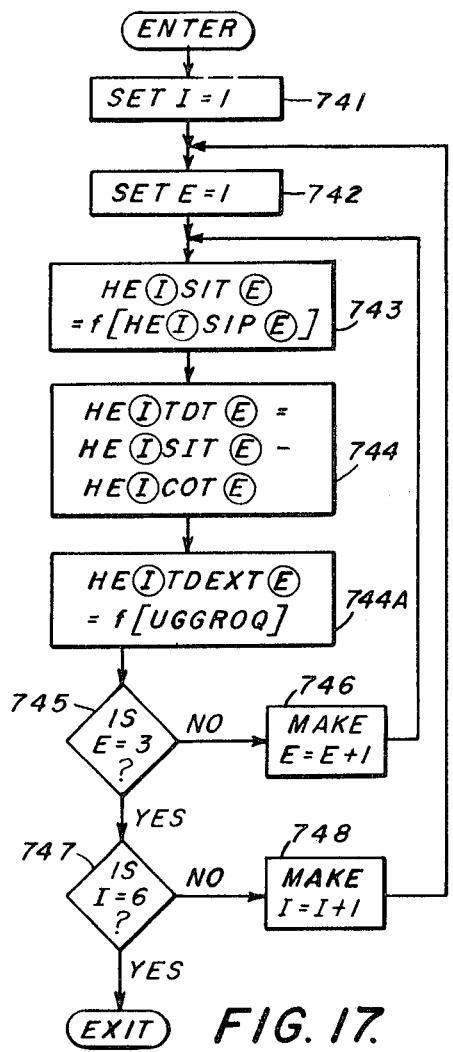
FIG. 17 shows a schematic diagram of a flow chart for the heater performance sub-program of FIG. 10.

This sub-program prepares the terminal temperature difference calculation for each of the six heaters in each heater train for individual printout. It is initiated as shown in the flow chart of FIG. 17 by setting the integers I and E equal to 1 in blocks 741 and 742 respectively. The steam inlet temperature of heater No. 1 in the first heater train is then calculated in block 743 as a function of the steam inlet pressure on the associated heater from the saturated liquid steam table. Next the heater terminal temperature difference is calculated in block 744 by subtracting the associated condensate outlet temperature from the steam inlet temperature. Since at this point E does not equal 3 in block 745, it will be made equal to E+1 in block 746 and the program will loop back to block 743. In this manner, the program will then compute the terminal temperature difference of the No. 1 heater in the second and third heater trains. Since E will equal 3 after the third time through the loop, the I integer will be interrogated in block 747. Since I will not equal 6 at this point, I will be made equal to I+1 in block 748 and the program will loop back to block 742. This will reset E equal to 1 and the terminal temperature difference for heater No. 2 in each heater train will be calculated in the manner discussed above. It will be appreciated then that the terminal temperature difference for each heater in each heater train will be calculated by the program of FIG. 17.

8. Main Feedwater Pump Performance Sub-Program

Figure 18:
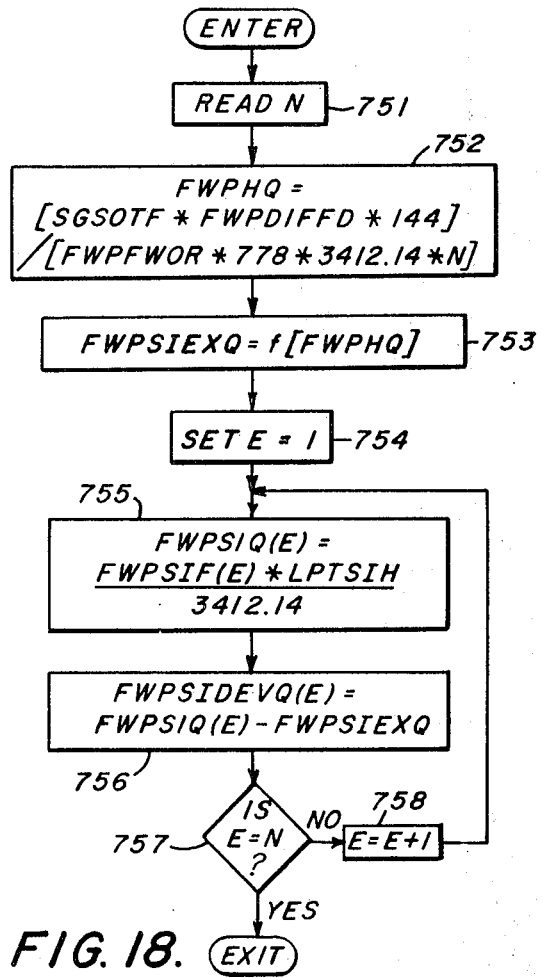
FIG. 18 shows a schematic diagram of a flow chart for the main feedwater pump performance sub-program of FIG. 10.

The sub-program of FIG. 18 is employed when the feedwater pumps are turbine driven by steam from the reheaters as indicated in FIG. 4. Initially, the integer N is set equal to the number of feedwater pumps running in block 751. The average hydraulic power generated by each feedwater pump is then calculated in block 752 by multiplying the steam generator total flow, which is equal to the feedwater flow, by the feedwater pump head and by a conversion factor and then dividing by the feedwater density multiplied two conversion factors and the number of pumps running, N. The expected power consumed by each of the steam driven pumps is then calculated in block 753 as a function of the average hydraulic power delivered from a stored curve. Next, the integer E is set equal to 1 in block 754. The actual power consumed by each pump is then calculated in block 755 by multiplying the measured steam flow to each pump by the enthalpy of the steam delivered which is the same as the enthalpy of the low pressure turbine inlet steam and dividing this product by the conversion factor 3412.14. The power deviation of the individual pump is then calculated in block 756 by subtracting the expected power consumed from the actual power consumed. If E is not equal to N in block 757, it is made equal to E+1 in block 758 and a loop is repeated until all of the main feedwater pumps have been evaluated.

9. Condensate Pump Performance Sub-Program

Figure 19:
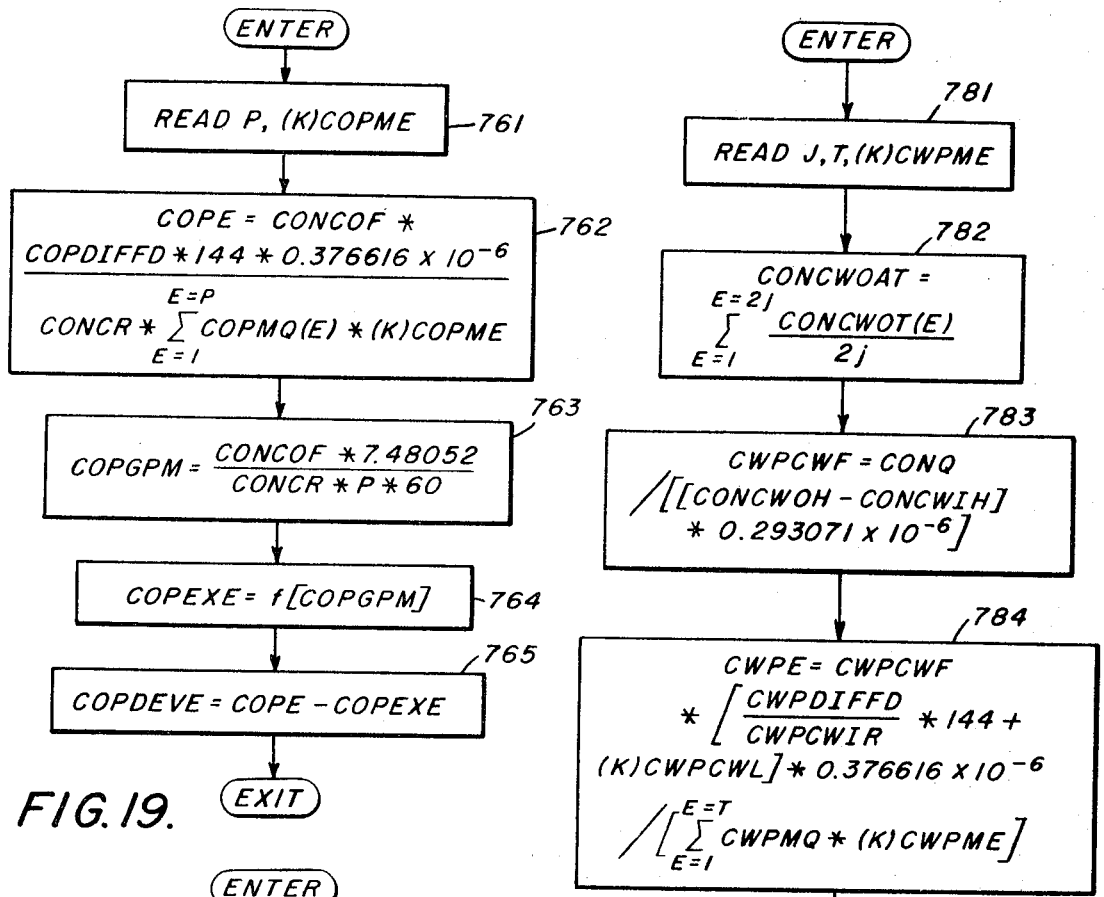
FIG. 19 shows an schematic diagram of a flow chart for the condensate pump performance sub-program of FIG. 10.

The condensate pumps which pump the liquid which accumulates in the hotwells of the condensers into the condensate lines passing through the heater trains, are driven by electric motors. As a first step in the program shown in FIG. 19 which calculates the average pump efficiency rather than the individual pump efficiency, the integer P is set equal to the number of running and the constant (K)COPME, representing the motor efficiency, is read in block 761. Next, the average pump efficiency is calculated in block 762 by multiplying the condensate total flow by the average pump head, COPDIFFD, and dividing by the condensate density multiplied by the sum of the individual motor kilowatts consumed and by the motor efficiency, all multiplied by a suitable conversion factor. The condensate density CONCR is determined from the steam tables as a function of the condensate temperature. The average flow through each pump in gallons per minute is then calculated in block 763 by dividing the condensate total flow by the condensate density multiplied by the number of pumps running and all multiplied by an appropriate conversion factor. The expected average pump efficiency can then be determined from a stored curve in block 764 as a function of the average gallons per minute. Finally in block 765, the deviation in pump efficiency is determined by subtracting the expected efficiency from the calculated efficiency.

10. Heater Drain Pump Performance Sub-Program

Figure 20:
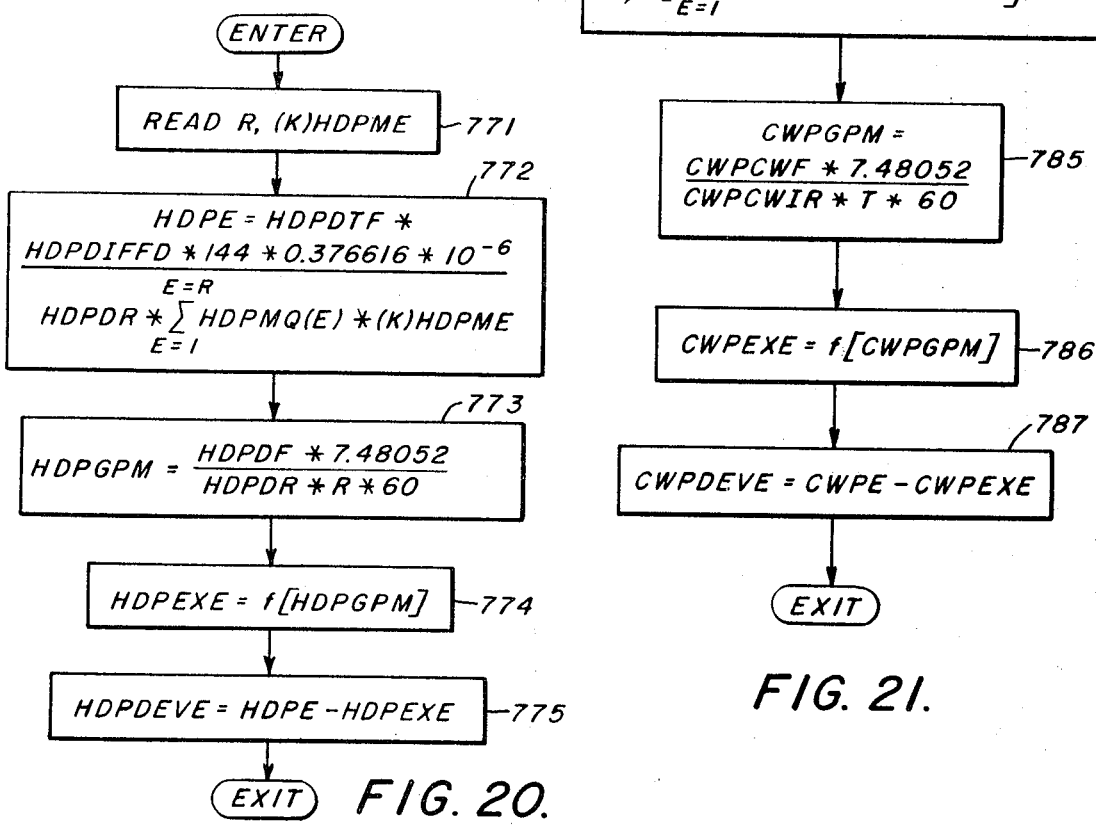
FIG. 20 shows a schematic diagram of a flow chart for the heater drain pump performance sub-program of FIG. 10.

As in the case of the condensate pumps, the heater drain pumps are electrically driven and the average rather than the individual pump efficiency is analyzed. In fact, with the understanding that the integer R is equal to the number of heater drain pumps running and that HDPME is the heater drain pump motor efficiency, the drain pump program shown in FIG. 20 can be followed with little difficulty since it parallels the condensate program just discussed.

11. Circulating Water Pump Performance Sub-Program

Figure 21:
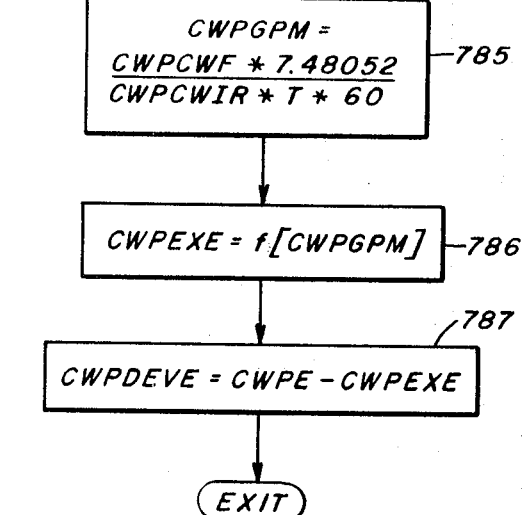
FIG. 21 shows a schematic diagram of a flow chart for the circulating water pump performance sub-program of FIG. 10.

Referring to the flow chart in FIG. 21, the sub-program begins by reading J, the number of condensers, T, the number of circulating water pumps running and (K) CWPME the circulating water pump motor efficiency in block 781. The temperature readings from the two sensors in the circulating water lines leaving each condenser are average in block 782 to provide a circulating water average outlet temperature. The circulating water average inlet temperature was previously calculated in block 732 in the condenser performance sub-program. Knowing the circulating water inlet and outlet average temperatures, the circulating water inlet and outlet enthalpies can be determined from the steam tables.

Equating the heat rejected by the condensers of the circulating water mass flow times the change in enthalpy of the circulating water in the condensers, multiplying by the appropriate conversion factor and rearranging the equation, the circulating water flow can be calculated in block 783. The circulating water pump average efficiency can then be calculated in block 784 as the ratio of the work done by the pump in moving the circulating water, which is equal to the circulating water flow multiplied by the pump head divided by the circulating water density, plus the work done in lifting the circulating water the distance L from the heat sink to the condensers which is equal to the circulating water flow multiplied by the distance that the water must be lifted, to the power consumed by the pump motors multiplied by the motor efficiency. The circulating water density CPCWIR is determined from the steam tables as a function of the circulating water average inlet temperature. The average gallons per minute pumped by each of the circulating water pumps is calculated in block 785 by dividing the total circulating water mass flow by the circulating water density multiplied by the number of pumps running and the appropriate conversion factor. The circulating water expected average efficiency can then be determined in block 786 from a stored curve as a function of the gallons per minute pumped by each pump. Finally, the deviation in the circulating water pump efficiency is determined in block 787 by subtracting the expected efficiency from the calculated efficiency.

D. Plant Overall Performance Evaluation Program

Figure 22:
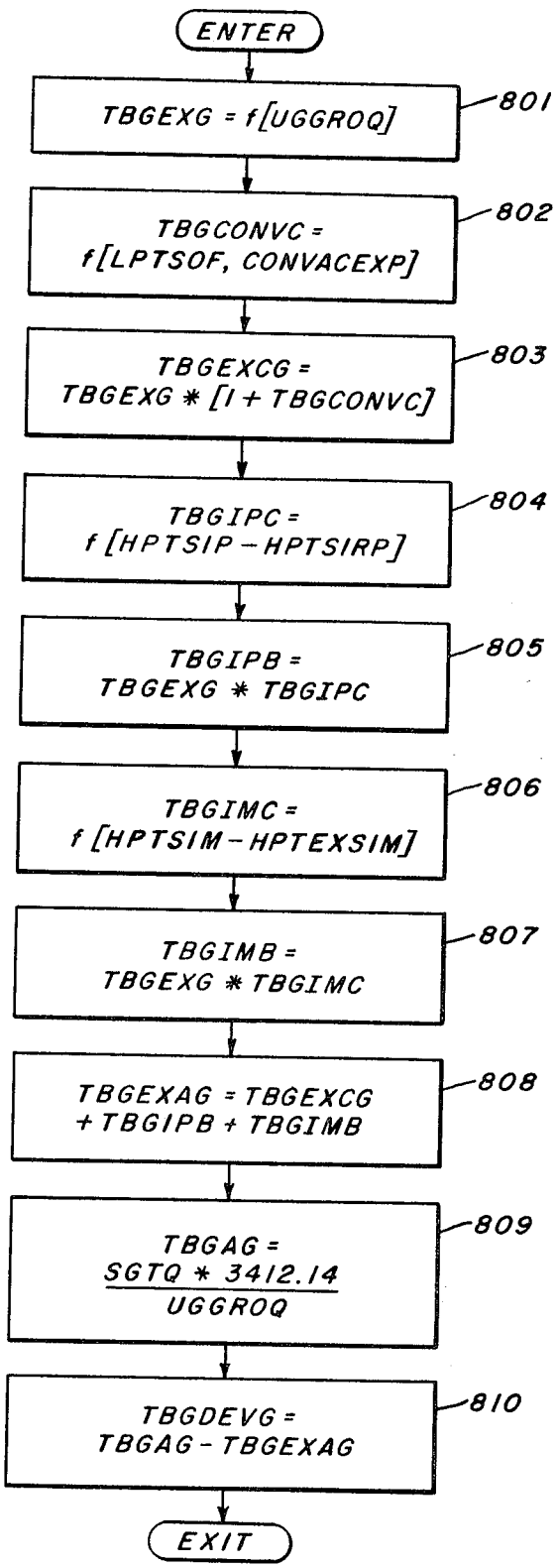
FIG. 22 illustrates a schematic diagram of a flow chart for the plant overall performance evaluation program employed by the computer.

The overall performance program calculates the plant heat rate which can be defined as the number of btu which the steam generator must supply in order for the generator to produce one kilowatt-hour of electricity. Referring to FIG. 22 for the flow chart of the program, the block 801 calculates the turbine generator gross expected heat rate as a function of the electrical load. A condenser vacuum correction factor to the gross heat rate which accomodates for the ambient conditions affecting the heat sink is calculated in block 802 from a stored curve as a function of the flow pressure, turbine exhaust flow and the expected condenser vacuum pressure. This latter value, it will be remembered, was calculated in block 733 of the condenser evaluation program as a function of the total heat rejected, the average condenser circulating water inlet temperature and the number of circulating water pumps running. The low pressure turbine exhaust flow is calculated in block 654 of the low pressure evaluation program. However, if the turbine efficiency calculations are not performed, the turbine exhaust flow can be calculated from a stored curve as a function of load. The turbine generator gross expected heat rate corrected for actual condenser inlet temperature is calculated in block 803 by multiplying the gross expected heat rate of block 801 by 1 plus the correction factor calculated in block 802.

A gross heat rate turbine inlet pressure correction factor is determined in block 804 as a function of the difference between the actual high pressure turbine steam inlet pressure calculated in block 506 of the high pressure turbine performance sub-program and the rated steam inlet pressure which is determined from a stored curve as a function of the steam generator total output. The heat rate increment due to the high pressure turbine inlet pressure deviation is calculated in block 805 by multiplying the expected gross heat rate of block 801 by the correction factor just computed.

Next, a gross heat rate inlet moisture content correction factor is calculated in block 806 as a function of the difference between the calculated high pressure turbine steam inlet moisture content and the expected steam inlet moisture content. The calculated value of moisture content is determined from the steam tables as a function of the high pressure turbine steam inlet pressure and enthalpy. The expected steam inlet moisture content is calculated from a stored curve as a function of the electrical load UGGROQ. The heat rate increment due to the high pressure turbine inlet moisture deviation is then calculated in block 807 by multiplying the gross expected heat rate of block 801 by the inlet moisture content correction factor.

The expected gross heat rate corrected for the actual circulating water inlet temperature and the high pressure turbine inlet pressure and moisture content can then be calculated in block 808 by adding the heat rate increments due to inlet pressure deviation and inlet moisture deviation to the expected gross heat rate corrected for inlet temperature. The turbine generator actual gross heat rate is next calculated in block 809 by dividing the steam generator total thermal power by the generator gross electrical output and multiplying by the appropriate conversion factor. Finally, the deviation in the gross heat rate is calculated in block 810 as the difference between the actual gross heat rate and the expected gross heat rate.

E. Data Output Program

Figure 24:
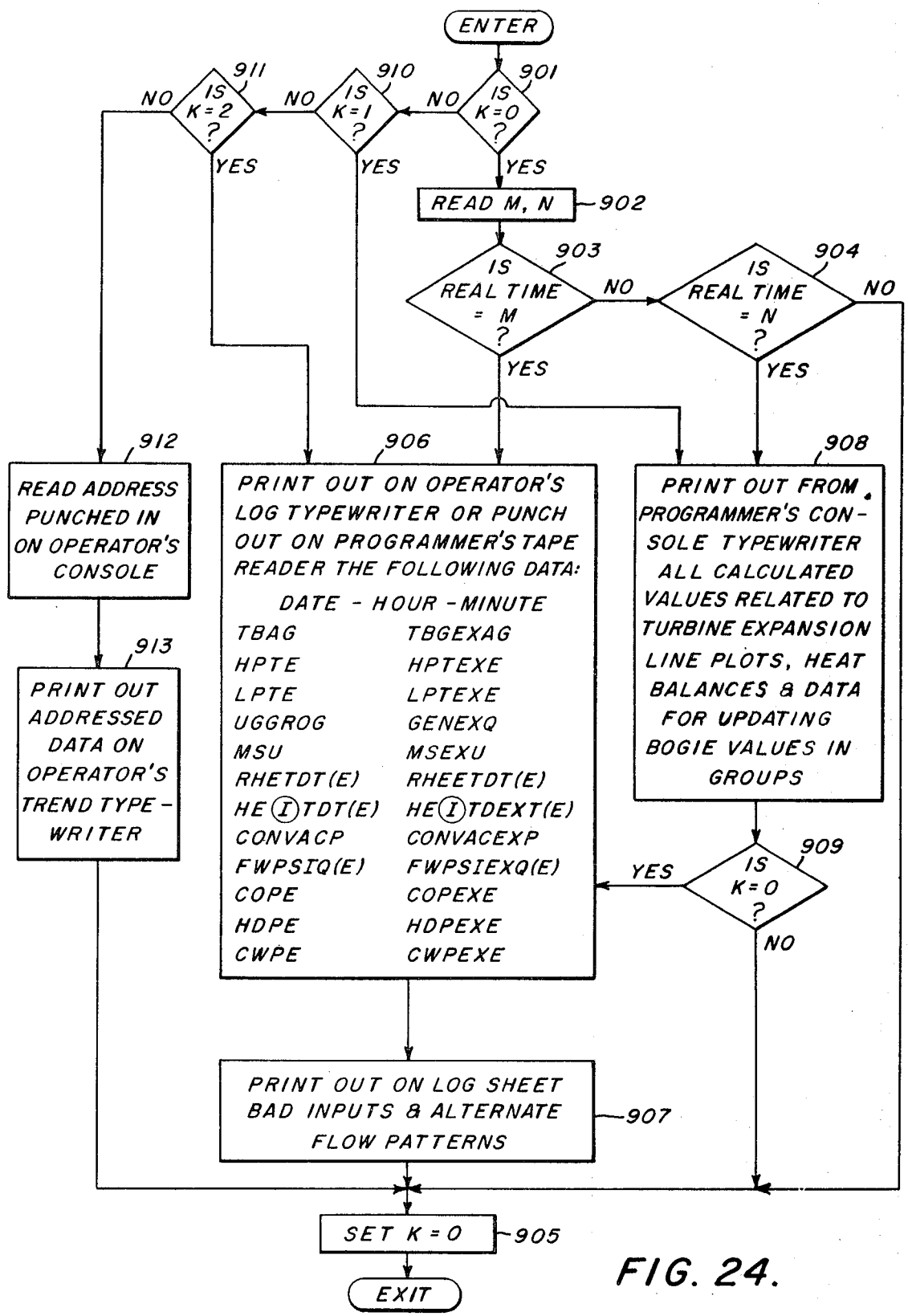
FIG. 24 is a schematic diagram of a flow chart for the data output program employed by the computer.

The flow chart for the data output program 900 of FIG. 7 is shown in FIG. 24. Several options in data output are available to the operator. He may select the output he desires through appropriate operation of his console push button identified generally by the reference character 67 in FIG. 5. In the absence of specific instructions from the operator, selected data is automatically printed out at predetermined intervals.

The operator may select alternate data output modes by operating push buttons which are effective to set an integer K equal to 1, 2 or 3. Upon completion of the plant overall performance evaluation program 800, the executive package 201 (See FIG. 7) initiates the data output program. If the value of the integer K is found to be equal to zero in block 901 indicating that the system is in the automatic data output mode, the value of variables M and N are read in block 902. The variables M and N are preset to the times of the day that automatic read outs are desired. The real time is first compared with the variable M in block 903 and if they are not equal, it is compared with the variable N in block 904. If the real time is not equal to N either, the integer K is reset equal to zero in block 905 and no data is outputted. The utility operating the system may set M and N equal to any desired time of the day. By way of example, M may be set equal to 12 noon and N equal to midnight. Obvious modifications to the program could be used to generate additional automatic outputs at other times of the day.

If the real time is equal to M, block 906 prints out on the operator's log typewriter, or punches out on the programmer's tape reader, as determined by operator push putton operation, the date, hour and minute and, side by side in column form, the calculated and expected values of the performance variables listed in the block. These variables include the turbine gross heat rate adjusted for actual conditions, the high and low pressure turbine efficiencies, the electrical power generated, moisture separator effectiveness, the terminal temperature difference for each reheater and each heater, the condenser vacuum pressure, the power consumed by each turbine driven feedwater pump and the average efficiencies of the condensate, heater drain and circulating water pumps. Next, block 907 prints out on the operator's log typewriter the bad inputs which were tagged by block 410 of the input reasonability evaluation program shown in FIG. 9. Block 907 also prints out indications of alternate flow patterns by identifying components out of service and the open condition of by-pass valves and blow-down valves. The program system assumes that all components are in operation and all by-pass valves are closed, however, notice of these abnormal conditions aides the operator in evaluating the performance calculations. Upon completion of the print out, K is set equal to zero in block 905.

Returning to block 904, when K is equal to zero and the real time is equal to N, block 908 prints out on the programmer's typewriter, all calculated values related to turbine expansion line plots (See FIG. 6), heat balances and data for updating the bogie values. The value of K is then tested again in block 909. Since it was assumed above that the print out program was in the automatic mode so that K equaled zero, the performance data of block 906 and the bad inputs and alternate flow patterns of block 907 will also be printed out.

Returning to block 901, if the initial test indicates that K is not equal to zero, block 910 determines if the operator has set it equal to 1. If the answer is yes, the information called for in block 908 is printed out. This time K will not be equal to zero in the test of block 909, but it will be set equal to zero in block 905 before the program is exited.

If K is not equal to 1 in block 910, then it will be compared with the integer 2 in block 911. By setting K equal to 2, the operator has called for the performance data of block 906 and the input and alternate flow pattern information of block 907. Again K will be set equal to zero in block 905.

If K is not equal to zero, 1 or 2, the operator must have set it equal to 3 indicating that he desired to call up the value of a variable not listed in the other printouts. The operating utility has the capability of individually selecting 100 of the 300 or more variables considered by the computer. These include the temperatures, pressures and flows monitored by the system in addition to the intermediate variables calculated by the computer. Therefore, if K is not equal to 2 in block 911, the address assigned to the variable selected by push button operation of the operator is read in block 912. Block 913 then prints out the addressed data on the operator's trend typewriter. K is again set equal to zero in block 905.

It can be seen then that data may be printed out automatically at predetermined intervals with some reports including more information than others. Furthermore, the operator may manually select between different groups of data on demand and he may further select particular variables for individual printout.

What is claimed is:

1. A method for accurately detecting the operating conditions of a steam turbine system having a plurality of sections, comprising the steps of:
   operating at least a portion of the plurality of sections of the turbine system under substantially similar conditions;
   monitoring corresponding parameters representative of the operation of the plurality of sections operating under similar conditions;
   generating electrical signals representative of the parameters monitored;
   determining electrically the difference between the largest and smallest values of the corresponding monitoring signals;
   comparing electrically this difference with a predetermined first design figure;
   comparing electrically the difference between each of the signals and a bogie figure when the difference between the largest and smallest value exceeds the first design figure;
   tagging electrically all monitoring signals which differ from the bogie figure by more than a second predetermined design figure; and
   displaying, in real time, upon command, the tagged signal and an indication of the associated monitoring sensor as being unreliable.

2. The method of claim 1 including an additional step of substituting the monitoring signal closest to the bogie figure for values of the monitoring signal which differ from the bogie figure by more than said second design figure.

3. The method of claim 2 including the additional step of operating the digital computer to calculating electrically the average of the monitoring signals using the substituted values for those values of the monitoring signal which differ from the bogie figure by more than said second design figure and displaying, in real time, upon command, the averages of pre-established groups of the monitoring signals.

4. A method of operating a steam turbine system in the wet steam region to obtain selected calculated performance variables including the steps of:
   operating the steam turbine with wet steam;
   monitoring the operation of the turbine to obtain corresponding signals representative of parameters on which the selected performance variables depend;
   generating electrical signals representative of the monitored parameters;
   providing an electrical representation of an assumed moisture content for the wet steam;
   calculating electrically a first performance variable as a function of the assumed moisture content;
   determining electrically a calculated value of the moisture content as a function of the calculated performance variable and an independently calculated performance variable dependent upon the monitoring signals;
   comparing electrically the calculated value of moisture content with the assumed value and repeating the calculations substituting a function of the calculated moisture content for the assumed moisture content until the assumed and calculated values of the moisture content are within predetermined limits; and
   displaying, in real time, upon command, the calculated value of the moisture content within the predetermined limits.

43

5. The method of claim 4 wherein the independently calculated variables are calculated by performing an electrical representation of a heat balance around an adjacent portion of the turbine system from the signals obtained in monitoring the turbine parameters.

6. The method of claim 4 including the step of periodically recalculating each of the selected performance variables.

7. A method of operating a steam turbine to obtain on-line measurement of steam turbine wet steam group outlet enthalpies comprising the steps of:
operating the steam turbine in the wet steam region;
monitoring group inlet and outlet pressures;
generating electrical signals corresponding to the group inlet and outlet pressures monitored;
calculating electrically the change in enthalpy ( h) for isentropic expansion in a selected group as a function of the group inlet enthalpy and the group inlet and outlet pressures monitored;
providing an electrical representation of an assumed moisture content for the outlet steam;
calculating electrically the outlet steam enthalpy as a function of h and the assumed moisture content;
calculating electrically the moisture content of the outlet steam as a function of the calculated outlet enthalpy;
comparing electrically the calculated moisture content with the assumed moisture content;
electrically iteratively recalculating the calculated wet steam enthalpy using a function of the calculated moisture content as the assumed moisture content until the deviation between the calculated moisture content and the assumed moisture content is within predetermined limits; and
displaying, in real time, upon command, the calculated moisture content within the predetermined limits.

8. The method of claim 7 wherein the step of calculating the wet steam extraction enthalpy includes the steps of:
calculating electrically the average moisture content for the group;
calculating electrically the wet steam outlet enthalpy as a function of said average moisture content and the designed group efficiency; and
displaying, in real time, upon command, the wet steam outlet enthalpy.

9. The method of claim 8 including the step of calculating electrically the group efficiency as a function of the group steam flow, and displaying, in real time, upon command, the calculated group efficiency.

10. The method of claim 7 including the steps of periodically reinitiating the calculation of the wet steam extraction enthalpy whereby the operating trend of the selected group may be monitored from a display, in real time, of the periodically calculated value of wet steam extraction enthalpy.

11. The method of claim 7 adapted for monitoring the inlet enthalpy of the wet steam passed on to the next succeeding group in a steam turbine having moisture removal means for the selected group comprising the steps of:
calculating electrically the moisture removal flow for the selected group, and
further calculating electrically the inlet enthalpy of the set steam passed on to the next group from a heat balance around the extraction point using the calculated moisture removal flow and the specific enthalpy of saturated water at the extraction pressure to determine the heat extracted by the removed moisture.

12. The method of claim 11 wherein the moisture removal flow is calculated as a function of the selected group steam flow, the calculated moisture content and the design moisture removal effectiveness.

13. The method of claim 7 adapted for on-line determination of the efficiency of a selected group including the additional steps of:
determining electrically the difference between the calculated input and output enthalpies for the selected group, and
further determining the group efficiency as a function of the ratio of this difference to Δh.

14. A method of operating a steam turbine system in the wet steam region including extracting a portion of the wet steam and liquid moisture between turbine groups in a mixed flow and on-line monitoring of turbine performance with the mixed flow extraction, comprising the steps of:
monitoring the pressure of the mixed flow extracted;
generating a signal representative of the monitored pressure;
determining the combined enthalpy and mixed flow of the wet steam and liquid extracted;
providing an electrical representation of an assumed moisture content of the steam prior to extraction;
calculating electrically the flow of removed moisture as a function of the assumed moisture content;
determining electrically the enthalpy of the extracted liquid as a function of the extraction pressure monitored;
determining electrically the enthalpy of the extracted steam from the enthalpy and flows of the liquid removed and the total extraction flow;
calculating electrically the enthalpy of the wet steam prior to extraction from a heat balance dependent in part on the monitored pressure around the extraction point;
calculating electrically the moisture content of wet steam prior to extraction as a function of the enthalpy of the steam prior to extraction;
comparing electrically the calculated moisture content with the assumed moisture content and to iteratively recalculate the enthalpies of the extracted steam and the steam prior to extraction until the deviation between the calculated moisture content and the assumed moisture content is within predetermined limits; and
displaying, in real time, upon command, the calculated moisture content within the predetermined limits.

15. A method of operating a steam turbine system to obtain on-line measurement of turbine expansion line points for a steam turbine having extraction lines for each of a plurality of groups comprising the steps of:
extracting a portion of the wet steam and liquid moisture in a mixed flow at each of the turbine groups;
monitoring the extraction pressures of the mix flow at each of the extraction points;
monitoring the total extraction flow for the plurality of groups;
generating electrical signals representative of respective pressures and total flow monitored;

calculating electrically the expansion line points for each extraction at each group as a function of the extraction pressure monitored;

calculating electrically the extraction flows as a function of the expansion line points;

calculating electrically a correction factor as a function of the ratio of the measured total extraction flow monitored to the sum of the calculated group extraction flows; and applying the correction factor to the extraction flows and then recalculating the expansion line points as a function of the corrected extraction flows.

16. The method of claim 15 including the step of removing mositure from at least some of said groups and wherein the steps of calculating the expansion line points and the extraction flows include steps to modify the calculations for moisture removal.

17. The method of claim 16 wherein the step of calculating the expansion line points includes the step using an assumed moisture content to calculate the group inlet and outlet enthalpies, wherein the step of recalculating the expansion line points includes the steps of recalculating the inlet and outlet enthalpies by performing heat balances around the extraction points using the corrected extraction flows.

18. The method of claim 15 including the steps of:
heating the feedwater for the steam generator associated with the turbine to raise the enthalpy thereof by passing the feedwater through a series of heaters each served by an extraction line;

monitoring the temperature and pressure around the heaters;

generating an electrical signal representative of the temperatures and pressures monitored around the heaters;

providing an electrical representation of a heat balance from the monitored temperature and pressures around the heaters; and solving for the extraction flows from the electrical representation of the heat balance around the associated heaters.

19. The method of claim 15 wherein the step of recalculating the expansion line points includes the steps of computing electrically heat balances around the extraction points using the corrected extraction flows.

20. A method of operating a steam turbine system in the wet steam region to analyze the performance of the last group of the high pressure turbine in a Rankine regenerative steam turbine cycle including the steps of:
operating the last group of the high pressure turbine with wet steam;

monitoring the temperature and pressure of the exhaust steam exiting from the reheaters associated with the Rankine cycle;

generating an electrical signal representative of the pressures and temperatures monitored;

providing an electrical representation of an assumed relative proportion of last group steam flow which is directed to the reheater of the Rankine regenerative cycle as exhaust steam and the proportion which is directed to the feedwater heater of the regenerative cycle as extraction steam;

determining electrically the enthalpy of the reheated exhaust steam as a function of the temperature and pressure monitored;

providing an electrical representation of a heat balance around the reheater using the assumed proportion of reheated exhaust steam to calculate the enthalpy of the exhaust steam;

performing electrically a heat balance around the heater to determine the calculated extraction flow using the calculated enthalpy of the exhaust steam for that of the extraction steam; and comparing electrically the calculated and assumed values of the extraction flow and iteratively electrically performing the heat balances substituting a function of the calculated extraction flow for the assumed extraction flow until the difference between the calculated value and assumed value is within predetermined limits.

21. The method of claim 20 including the steps of:
mechanically removing moisture from the exhaust turbine steam employing a moisture separator, prior to reheating;

monitoring the temperature of the moisture removed from the exhaust steam prior to reheating;

generating a signal representative of the temperature monitored;

determining electrically the amount of moisture removed from the exhaust steam by the moisture separator;

performing electrically the heat balance around the reheater using the exhaust flow minus the amount of moisture removed by the moisture separator as the flow of steam into the reheater to determine the enthalpy of the steam leaving the moisture separator; and performing electrically an additional heat balance around the moisture separator employing the monitored temperature of the separated moisture to determine the enthalpy of the exhaust steam supplied to the moisture separator.

22. A method of operating a steam turbine to provide on-line monitoring of the exhaust enthalpy of the turbine system operating in the wet steam region including the steps of:
operating the turbine with wet steam;

monitoring the temperature and pressure around the condensers receiving the exhaust steam from the turbine;

generating an electrical signal representative of the temperature and pressure monitored;

providing an electrical representation of an assumed exahust steam moisture content;

calculating electrically the exhaust enthalpy as a function of the assumed moisture content;

calculating electrically the condenser steam inlet enthalpy from the monitored condenser temperature and pressure signal; and comparing electrically the values of the exhaust enthalpy and the condenser inlet enthalpy and iteratively electrically recalculating the exhaust enthalpy by adjusting the assumed moisture content as a function of the difference between the exhaust enthalpy and the condenser inlet enthalpy until this difference is within predetermined limits.

23. The method of claim 22 wherein the condenser inlet enthalpy is calculated by electrically performing a heat balance around the condenser utilizing the monitored condenser temperature and pressure signals.

* * * * *